United States Patent
Ge et al.

(10) Patent No.: US 9,351,201 B2
(45) Date of Patent: May 24, 2016

(54) SYSTEM AND METHOD FOR REDUCING DATA LOSS DURING A SERVING CELL CHANGE IN A MULTI-FLOW HSDPA COMMUNICATION NETWORK

(71) Applicant: QUALCOMM Incorporated, San Diego, CA (US)

(72) Inventors: Weiyan Ge, San Jose, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 13/766,946

(22) Filed: Feb. 14, 2013

(65) Prior Publication Data

US 2013/0235844 A1    Sep. 12, 2013

Related U.S. Application Data

(60) Provisional application No. 61/608,433, filed on Mar. 8, 2012.

(51) Int. Cl.
*H04W 36/00* (2009.01)
*H04W 36/08* (2009.01)
*H04W 36/02* (2009.01)

(52) U.S. Cl.
CPC .......... *H04W 36/00* (2013.01); *H04W 36/0055* (2013.01); *H04W 36/023* (2013.01); *H04W 36/08* (2013.01)

(58) Field of Classification Search
None
See application file for complete search history.

(56) References Cited

U.S. PATENT DOCUMENTS

| | | |
|---|---|---|
| 2004/0008646 A1 | 1/2004 | Park et al. |
| 2005/0094618 A1 | 5/2005 | Colban et al. |
| 2005/0136833 A1 | 6/2005 | Emeott et al. |
| 2007/0286125 A1* | 12/2007 | Lee et al. ............... 370/331 |
| 2008/0014957 A1* | 1/2008 | Ore ...................... 455/452.1 |
| 2009/0163207 A1 | 6/2009 | Randall et al. |
| 2012/0052868 A1 | 3/2012 | Tomita et al. |
| 2012/0147869 A1 | 6/2012 | Chhatriwala et al. |
| 2012/0201226 A1 | 8/2012 | Sambhwani et al. |
| 2012/0243504 A1 | 9/2012 | Hsieh et al. |
| 2013/0114418 A1* | 5/2013 | Kubota et al. ........... 370/248 |
| 2014/0050145 A1* | 2/2014 | Racz et al. ............. 370/328 |

FOREIGN PATENT DOCUMENTS

| | | |
|---|---|---|
| WO | 02052869 A2 | 7/2002 |
| WO | 2005046284 A2 | 5/2005 |

OTHER PUBLICATIONS

International Search Report and Written Opinion—PCT/US2Q13/029568—ISA/EPO—Jun. 19, 2013.

* cited by examiner

*Primary Examiner* — Awet Haile
(74) *Attorney, Agent, or Firm* — François A. Pelaez

(57) ABSTRACT

A method and apparatus for wireless communication may provide for reduced data loss during mobility events in a wireless communication network capable of downlink carrier aggregation. Some aspects of the disclosure provide for maintaining data corresponding to a flow in at least one buffer at a Node B when the Node B acts as a serving cell for the same UE both before and after a serving cell change. Another aspect of the disclosure provides for transferring buffered data from a Node B that acts as a serving cell for a UE before a serving cell change, to a Node B that acts as a serving cell for the UE after the serving cell change.

34 Claims, 18 Drawing Sheets

SYSTEM AND METHOD FOR REDUCING DATA LOSS DURING A SERVING CELL CHANGE IN A MULTI-FLOW HSDPA COMMUNICATION NETWORK

CROSS-REFERENCE TO RELATED APPLICATIONS

This application claims priority to and the benefit of provisional patent application No. 61/608,433, titled "System and Method for Reducing Data Loss During a Serving Cell Change in a Multi-flow HSPDA Communication Network" and filed in the United States Patent and Trademark Office on Mar. 8, 2012, the entire content of which is incorporated herein by reference.

BACKGROUND

1. Field

Aspects of the present disclosure relate generally to wireless communication systems, and more particularly, to serving cell changes in a system configured for downlink for carrier aggregation.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

As an example, Multi-Flow HSDPA has been recently introduced, in which plural cells (provided by a single base station or plural base stations) can provide high-speed downlink communication to a mobile station, such that the mobile station is capable of aggregating the transmissions from those cells, within the same frequency carrier. As a relatively new system, various issues arise in this system that may not have been addressed in other downlink carrier aggregation systems such as DC-HSDPA. Thus, there is a need to identify and address issues relating to system-level architecture, packet flow control, mobility, and others.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspect of the disclosure. Its sole purpose is to present some concepts of one or more aspects of the disclosure in a simplified form as a prelude to the more detailed description that is presented later.

According to one embodiment, the disclosure provides a method of wireless communication in which data loss during a serving cell change in a multi-flow HSPDA communication network is reduced. In the method, a downlink flow is transmitted from the RNC to a user equipment (UE) utilizing at least a first base station and a second base station to provide a first serving cell and a second serving cell, respectively, to be aggregated at the UE. The serving cells may be from one or more different Node Bs and one or more different frequencies/carriers. Next, a serving cell change may be performed by the RNC where the first base station or the second base station continues to act as a serving cell to the UE. Data corresponding to the flow before the serving cell change may be maintained within a queue at the acting serving cell for transmission to the UE after the serving cell change. The cell qualities of the first serving cell and the second serving cell are ranked from strongest to weakest to select the acting serving cell. The acting serving cell is the primary serving cell and the non-selected serving cell is the secondary serving cell.

Prior to performing the serving cell change, a report from the UE may be received ranking the cell qualities of the first serving cell and the second serving cell, where the acting serving cell is selected based on strongest cell quality from the ranked cell qualities; and wherein the acting serving cell is a primary serving cell and the non-selected serving cell is the secondary serving cell. Additionally, the cell qualities of one or more neighboring serving cells, provided by one or more base stations, may be ranked. A neighboring serving cell may be added to an active set associated with the UE when the cell quality of the neighboring cell is stronger than the cell quality of the primary serving cell or the secondary serving cell upon the occurrence of the mobility event. When there is a serving change, instructions may be sent to the acting serving cell to maintain data corresponding to the flow before the serving cell change within a queue at the acting serving cell for transmission to the UE after the serving cell change.

A mobility event may be a UE measurement of $E_c/I_0$ for a particular serving cell that reaches a predetermined threshold and maintains the predetermined threshold for a predetermined time or a measurement of $E_c/I_0$ for a particular serving cell falls that below a predetermined threshold and maintains the predetermined threshold for a predetermined time. Upon the occurrence of a mobility event, a neighboring serving cell from the one or more neighboring serving cells is added to an active set associated with the UE when the cell quality of the neighboring cell is stronger than the cell quality of the primary serving cell or the secondary serving cell.

According to one aspect, a primary serving cell change may be performed by replacing the primary serving cell with the neighboring serving cell when the cell quality of the neighboring serving cell is greater than the cell quality of the primary serving cell. The neighboring serving cell then becomes a new primary serving cell. Additionally a secondary serving cell change may be performed by replacing the secondary cell with the primary serving cell when the cell quality of the primary serving cell is greater than the cell quality of the secondary serving cell. The primary serving cell becoming a new secondary serving cell. Data corresponding to the flow is maintained within a queue at the new primary serving cell and the data corresponding to the flow is flushed from a queue at the secondary serving cell.

According to one aspect, a primary serving cell change may be performed by replacing the primary serving cell with the secondary serving cell when the cell quality of the secondary serving cell is greater than the cell quality of the primary serving cell. The secondary serving cell then becomes a new primary serving cell. Additionally a secondary serving cell change may be performed by replacing the secondary cell with the neighboring serving cell when the cell quality of the neighboring serving cell is greater than the cell quality of the secondary serving cell. The neighboring serving cell becomes a new secondary serving cell. Data corresponding to the flow is maintained within a queue at the new primary serving cell and the data corresponding to the flow is flushed from a queue at the secondary serving cell.

According to one aspect, a primary serving cell change may be performed by replacing the primary serving cell with the neighboring serving cell when the cell quality of the neighboring serving cell is greater than the cell quality of the primary serving cell. The neighboring serving cell then becomes a new primary serving cell. Data corresponding to the flow is maintained within a queue at the new primary serving cell and the data corresponding to the flow is flushed from a queue at the primary serving cell.

According to one aspect, the secondary serving cell is removed from the active set associated with the UE when the cell quality of the second serving cell is below a predetermined threshold. Data corresponding to the flow is flushed from a queue at the secondary serving cell.

According to one aspect, a primary serving cell change may be performed by replacing the primary serving cell with the secondary serving cell when the cell quality of the secondary serving cell is greater than the cell quality of the primary serving cell. The secondary serving cell then becomes a new primary serving cell. The primary serving cell is then removed from the active set associated with the UE when the cell quality of the primary serving cell is below a predetermined threshold. Data corresponding to the flow is flushed from a queue at the primary serving cell.

According to another embodiment, the disclosure provides an apparatus for wireless communication. The apparatus may comprise means for transmitting a downlink flow to user equipment (UE) utilizing at least a first base station and a second base station to provide a first serving cell and a second serving cell, respectively, to be aggregated at the UE; means for performing a serving cell change, wherein the first base station or the second base station continues to act as a serving cell to the UE; and means for maintaining data corresponding to the flow before the serving cell change within a queue at the acting serving cell for transmission to the UE after the serving cell change. Prior to performing the serving cell change, the apparatus may further comprise means for receiving a report from the UE ranking cell qualities of the first serving cell and the second serving cell, where the acting serving cell is selected based on strongest cell quality from the ranked cell qualities; and wherein the acting serving cell is a primary serving cell and the non-selected serving cell is the secondary serving cell. The report may further include ranking of the cell qualities of one or more neighboring cells, provided by one or more base stations, upon an occurrence of a mobility event; and wherein a neighboring cell is added to an active set associated with the UE when the cell quality of the neighboring cell is stronger than the cell quality of the primary serving cell or the secondary serving cell upon the occurrence of the mobility event.

Additionally, the apparatus may include means for sending instructions to the acting serving cell to maintain data corresponding to the flow before the serving cell change within a queue at the acting serving cell for transmission to the UE after the serving cell change.

According to another embodiment, the disclosure provides a computer program product comprising a computer-readable medium operable on a device configured to reduce data loss during a serving cell change in a multi-flow HSPDA communication network. The computer-readable storage medium may comprise instructions for causing a computer to transmit a downlink flow to user equipment (UE) utilizing at least a first base station and a second base station to provide a first serving cell and a second serving cell, respectively, to be aggregated at the UE; instructions for causing a computer to perform a serving cell change, wherein the first base station or the second base station continues to act as a serving cell to the UE; and instructions for causing a computer to maintain data corresponding to the flow before the serving cell change within a queue at the acting serving cell for transmission to the UE after the serving cell change. The computer-readable storage medium may further comprise instructions for causing a computer to transmit a downlink flow to user equipment (UE) utilizing at least a first base station and a second base station to provide a first serving cell and a second serving cell, respectively, to be aggregated at the UE; instructions for causing a computer to perform a serving cell change, wherein the first base station or the second base station continues to act as a serving cell to the UE; and instructions for causing a computer to maintain data corresponding to the flow before the serving cell change within a queue at the acting serving cell for transmission to the UE after the serving cell change.

According to another embodiment, the disclosure provides an apparatus configured to reduce data loss during a serving cell change in a multi-flow HSPDA communication network. The device may comprise at least on processor and a memory coupled to the at least one processor which is configured to transmit a downlink flow to user equipment (UE) utilizing at least a first base station and a second base station to provide a first serving cell and a second serving cell, respectively, to be aggregated at the UE; perform a serving cell change, wherein the first base station or the second base station continues to act as a serving cell to the UE; and maintain data corresponding to the flow before the serving cell change within a queue at the acting serving cell for transmission to the UE after the serving cell change. The at least one processor is further configured to rank cell qualities of the first serving cell and the second serving cell to select the acting serving cell, the acting serving cell having the strongest cell quality, wherein the acting serving cell is a primary serving cell and the non-selected serving cell is the secondary serving cell; monitor one or more neighboring serving cells, provided by one or more neighboring base stations, for a mobility event; and add a neighboring serving cell from the one or more neighboring serving cells to an active set associated with the UE when the cell quality of the neighboring cell is stronger than the cell quality of the primary serving cell or the secondary serving cell upon the occurrence of the mobility event.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
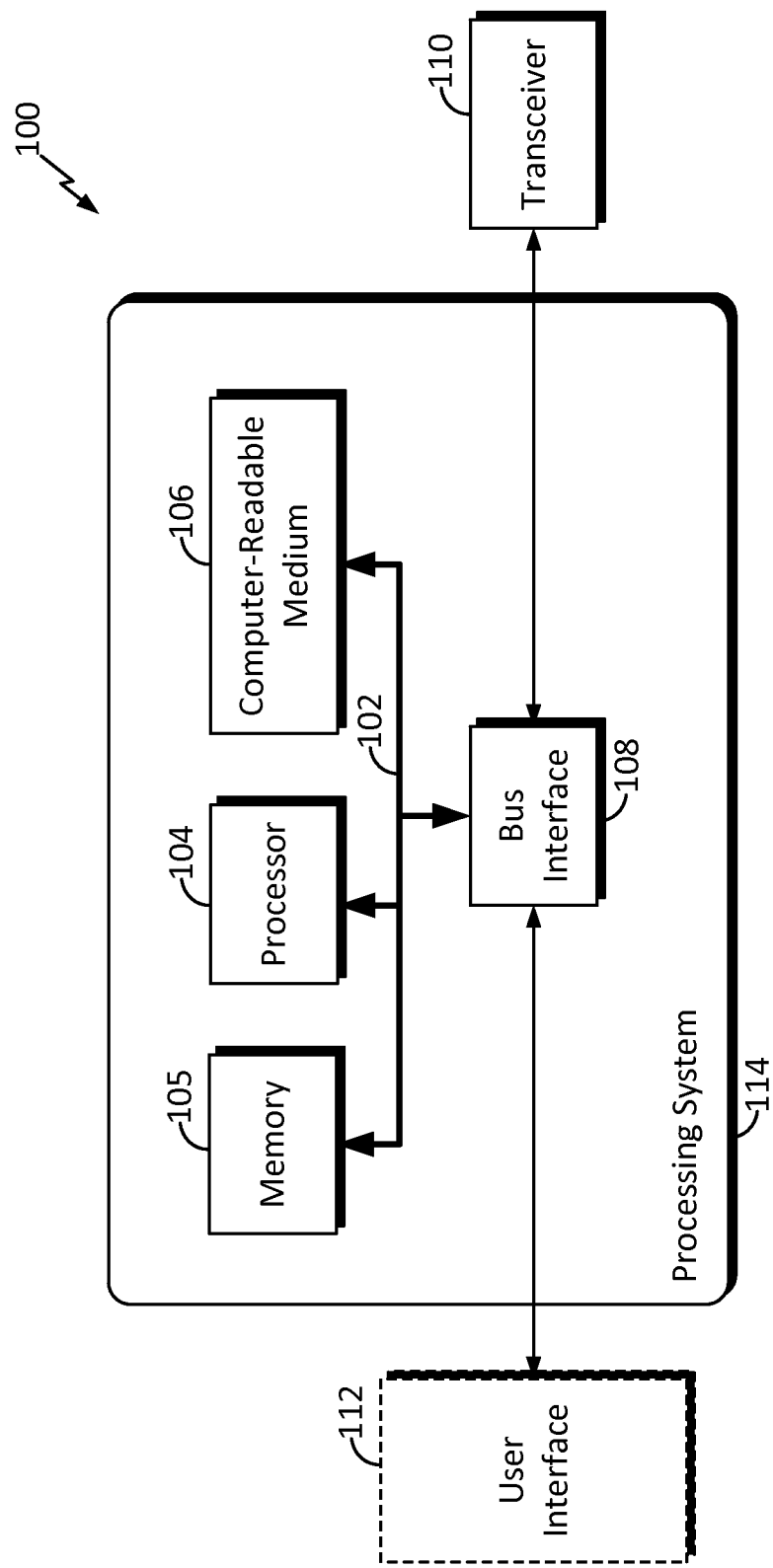
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
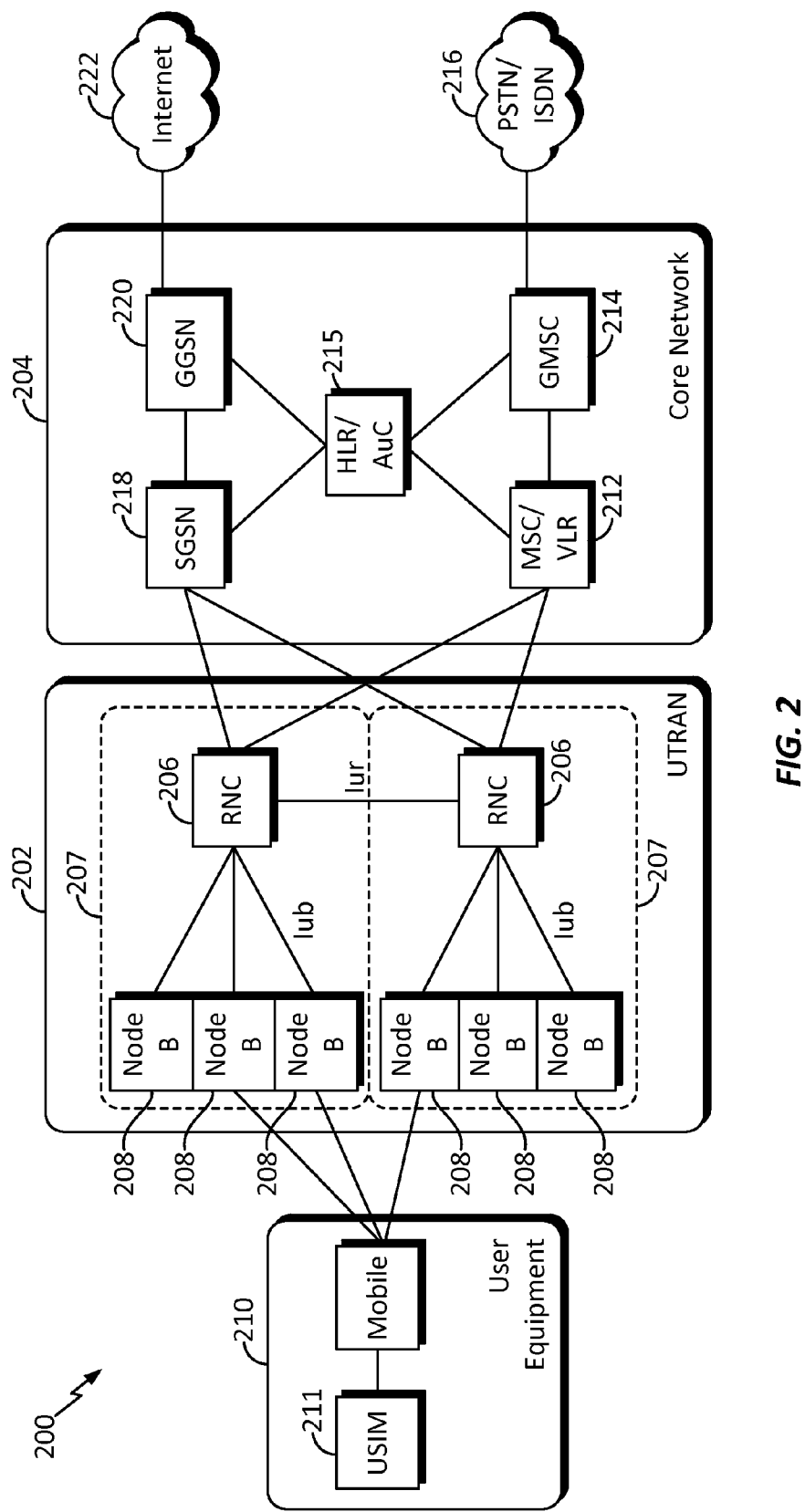
FIG. 2 is a block diagram conceptually illustrating an example of a wireless communication system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 3:
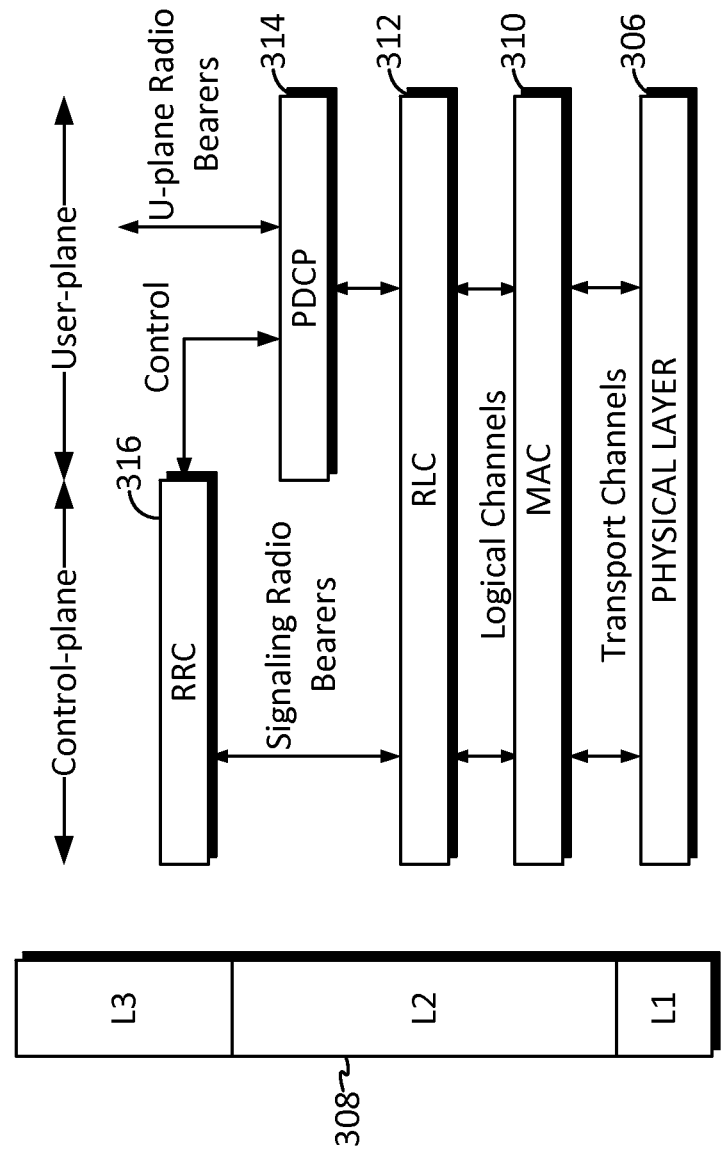
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 (L2 layer) 308 is above the physical layer 306 and is responsible for the link between the UE and Node B over the physical layer 306.

At Layer 3, the RRC layer 316 handles the control plane signaling between the UE and the RNC. RRC layer 316 includes a number of functional entities for routing higher layer messages, handling broadcast and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports acknowledged, unacknowledged, and transparent mode data transfers, and provides segmentation and reassembly of upper layer data packets, retransmission of lost data packets, and reordering of data packets to compensate for out-of-order reception due to a hybrid automatic repeat request (HARQ). That is, the RLC sublayer 312 includes a retransmission mechanism that may request retransmissions of failed packets. Here, if the RLC sublayer 312 is unable to deliver the data correctly after a certain maximum number of retransmissions or an expiration of a transmission time, upper layers are notified of this condition and the RLC SDU may be discarded.

Further, the RLC sublayer at the RNC 206 (see FIG. 2) may include a flow control function for managing the flow of RLC protocol data units (PDUs). For example, the RNC may determine an amount of data to send to a Node B, and may manage details of that allocation including dividing the data into batches and distributing those batches or packets among multiple Node Bs in the case of downlink aggregation, e.g., in a DC-HSDPA system or a Multi-Point HSDPA system.

The MAC sublayer 310 provides multiplexing between logical and transport channels. The MAC sublayer 310 is also responsible for allocating the various radio resources (e.g., resource blocks) in one cell among the UEs, as well as HARQ operations. The MAC sublayer 310 can include various MAC entities, including but not limited to a MAC-d entity and MAC-hs/ehs entity.

Figure 4:
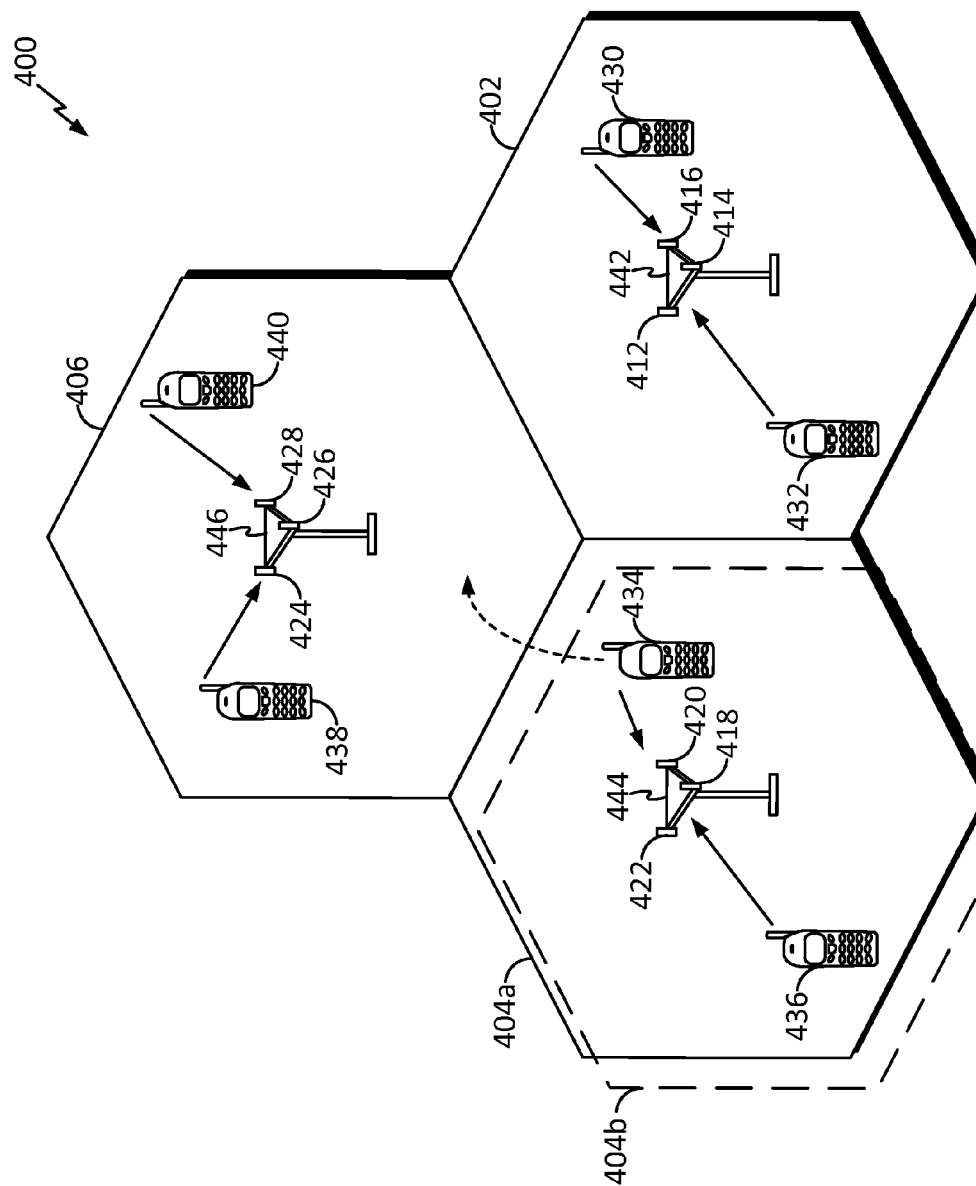
FIG. 4 is a conceptual diagram illustrating an example of an access network.

The UTRAN 202 is one example of a RAN that may be utilized in accordance with the present disclosure. Referring to FIG. 4, by way of example and without limitation, a simplified schematic illustration of a RAN 400 in a UTRAN architecture is illustrated. The system includes multiple cellular regions (cells), including cells 402, 404, and 406, each of which may include one or more sectors. In the present disclosure, the term "cells" may refer generally to communication channels between UEs and Node Bs, and may include sectors depending on the context. Cells may be defined geographically, e.g., by coverage area, and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

In a cell that is divided into sectors, the multiple sectors within the cell can be formed by groups of antennas, with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 406, antenna groups 424, 426, and 428 each correspond to a different sector.

The cells 402, 404 and 406 may include several UEs that may be in communication with one or more sectors of each cell 402, 404 or 406. For example, UEs 430 and 432 may be in communication with Node B 442, UEs 434 and 436 may be in communication with Node B 444, and UEs 438 and 440 may be in communication with Node B 446. Here, each Node B 442, 444, 446 is configured to provide an access point to a core network 204 (see FIG. 2) for all the UEs 430, 432, 434, 436, 438, 440 in the respective cells 402, 404, and 406.

During a call with the source cell 404a, or at any other time, the UE 436 may monitor various parameters of the source cell 404a as well as various parameters of neighboring cells such as cells 404b, 406, and 402. Further, depending on the quality of these parameters, the UE 436 may maintain some level of communication with one or more of the neighboring cells. During this time, the UE 436 may maintain an Active Set, that is, a list of cells that the UE 436 is simultaneously connected to (i.e., the UTRA cells that are currently assigning a downlink dedicated physical channel DPCH or fractional downlink dedicated physical channel F-DPCH to the UE 436 may constitute the Active Set). Here, the cells in the Active Set can form a soft handover connection to the UE. The UE may additionally include a neighbor set or monitored set, including a list of cells that the UE may measure, but whose signal strength is not high enough to be included in the Active Set.

Management of the Active Set can be enabled through the use of certain Radio Resource Control (RRC) messages between the RNC and UE. For example, the selection of cells to include in the Active Set may depend on certain UE measurements, which may be configured by the network in a system information block (SIB).

For example, the UE may measure a ratio between the signal strength and the noise floor ($E_c/I_0$) of a pilot signal (e.g., a common pilot channel CPICH) transmitted by each cell in the UE's monitored set. That is, the UE may determine the $E_c/I_0$ for nearby cells, and may rank the cells based on these measurements.

When the ranking of a cell changes, or if any other reporting trigger or measurement event (discussed in further detail below) occurs, the UE may send certain RRC messages to the RNC to report this event. Thus, the RNC may make a decision to alter the Active Set for the UE, and send an RRC message (i.e., an Active Set Update message) to the UE indicating a change in the Active Set. The RNC may then communicate with the respective Node B or Node Bs, e.g., over an Iub interface utilizing Node B Application Part (NBAP) signaling to configure the cells for communication with the UE. Finally, the RNC may communicate with the UE utilizing further RRC messages, such as a Physical Channel Reconfiguration (PCR) message, with an RRC response from the UE of PCR Complete indicating success of the reconfiguration.

Figure 5:
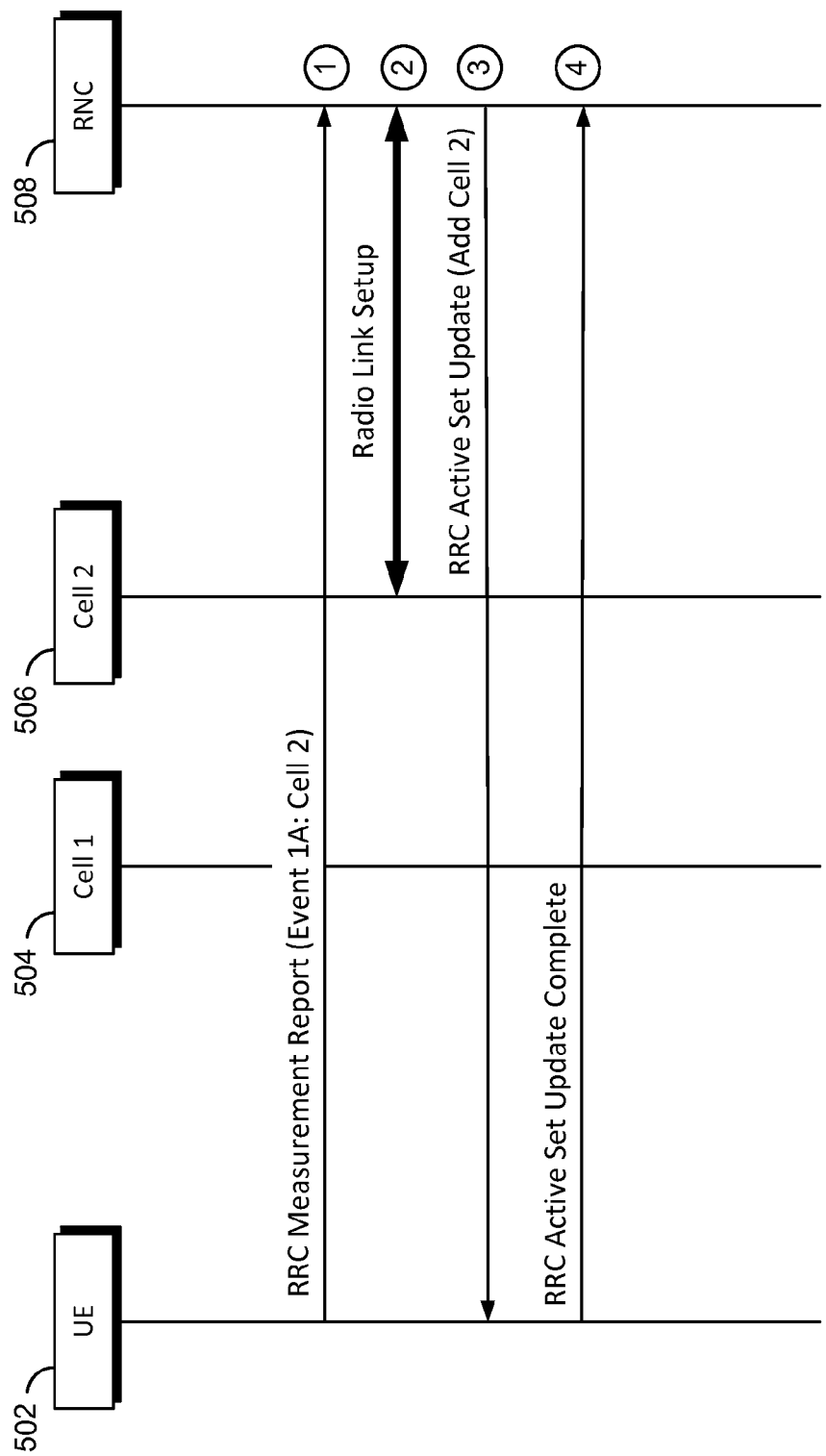
FIG. 5 is a call flow diagram illustrating an Event 1A procedure.

One reporting trigger may result when a primary CPICH enters the reporting range for the UE. That is, when the $E_c/I_0$ for a particular cell reaches a particular or predetermined threshold (e.g., a certain number of dB below the $E_c/I_0$ of the primary serving cell) and maintains that level for a certain time such that it may be appropriate to add the cell to the Active Set a reporting event called Event 1A may occur. FIG. 5 is a simplified call flow diagram illustrating some of the signaling among nodes for Event 1A. In this and the call flow diagrams to follow, time generally proceeds from the top of the diagram to the bottom, although in many cases the illustrated sequence of signals is not intended to be the only possible sequence, and other sequences may be utilized in accordance with various aspects of the present disclosure. Further, the sequence numbers at the right-hand side of the call flow diagrams are merely placed to ease a description, and each time number may represent any reasonable span of time from an instant to several seconds.

In the illustrated example, at time (1) the UE 502 has determined that a measurement of Cell 2 has increased above a threshold and entered a reporting range, and thus, the UE 502 may transmit an RRC Measurement Report message including Event 1A and identifying Cell 2, 506. In response, at time (2) the RNC 508 may communicate with Cell 2, 506, over the Iub interface utilizing NBAP signaling to set up a radio link with the UE 502. At time (3), the RNC 508 may send an RRC Active Set Update message to the UE 502 indicating to add Cell 2, 506, to its Active Set. The UE 502 may respond at time (4) with an RRC Active Set Update Complete message to the RNC 508, completing the Active Set update.

Figure 6:
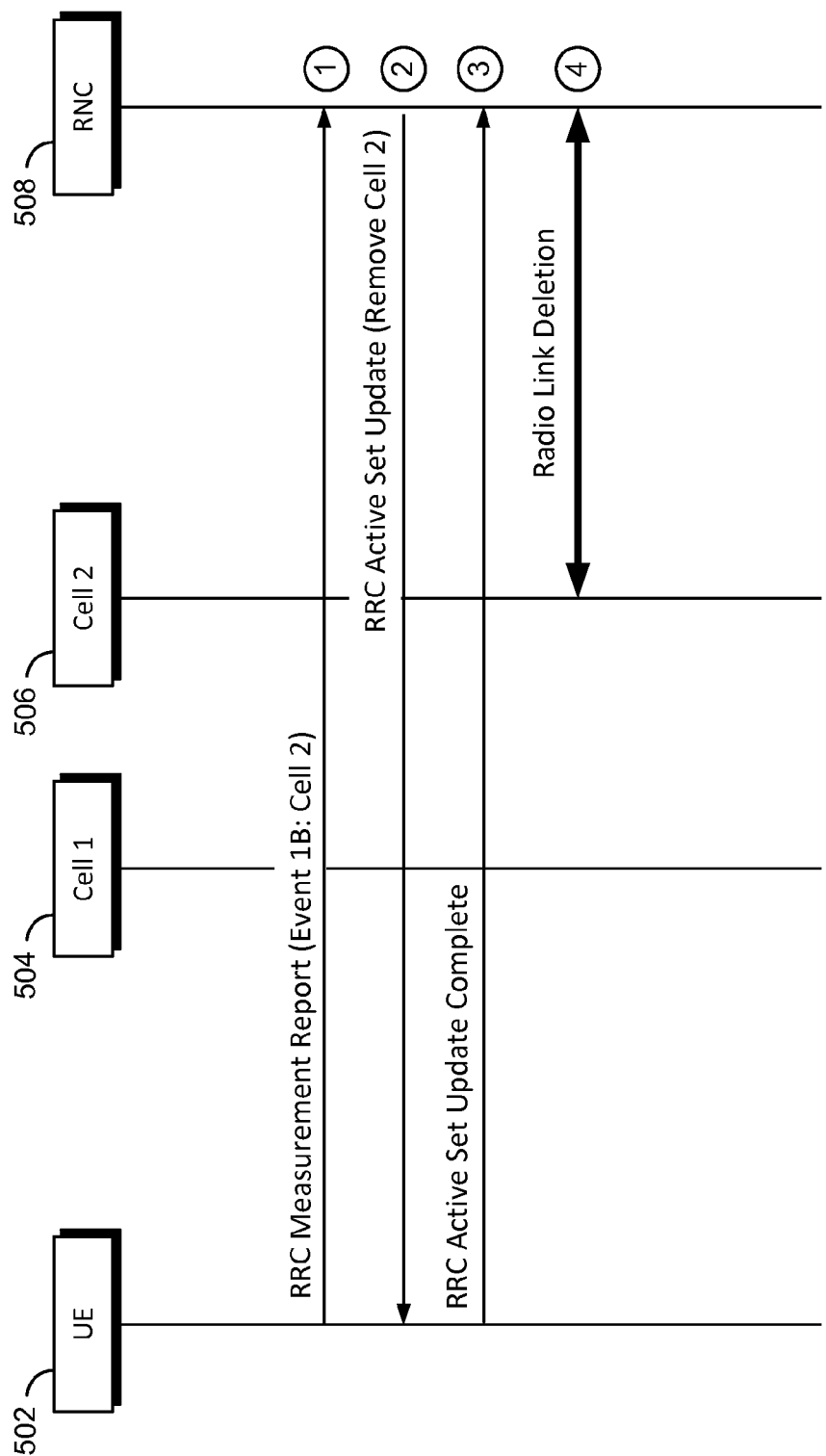
FIG. 6 is a call flow diagram illustrating an Event 1B procedure.

Another reporting trigger may result when a primary CPICH leaves the reporting range. That is, when the $E_c/I_0$ for a particular cell falls below a particular or predetermined threshold (e.g., a certain number of dB below the $E_c/I_0$ of the primary serving cell), and maintains that level for a certain time such that it may be appropriate to remove the cell from the Active Set a reporting event called Event 1B may occur. FIG. 6 is a simplified call flow diagram illustrating some of the signaling among nodes for Event 1B. In the illustrated example, at time (1) the UE 502 has determined that Cell 2, 506 has left the reporting range. Thus, the UE 502 may transmit the RRC Measurement Report message including Event 1B and identifying Cell 2 506. In response, at time (2) the RNC 508 may transmit an RRC Active Set Update message to the UE 502 indicating to remove Cell 2 506 from the Active Set. At time (3), the UE 502 may then respond with an RRC Active Set Update Complete message to the RNC 508, indicating that the Active Set is updated. At time (4) the RNC 508 may then transmit NBAP signaling over the Iub interface to Cell 2 506 to delete the radio link between Cell 2 506 and the UE 502.

Another reporting trigger may result when the Active Set is full, and a primary CPICH of a candidate cell outside the Active Set exceeds that of the weakest cell in the Active Set, such that it may be appropriate to replace the weakest cell in the Active Set with the candidate cell. Here, a reporting event called Event 1C may occur, causing a combined radio link addition and removal. Because the Event 1C is substantially a combination of the Event 1A and Event 1B, and is known to those skilled in the art, a detailed description is not included herein.

In Release 5 of the 3GPP family of standards, High Speed Downlink Packet Access (HSDPA) was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-DSCH may be associated with one or more HS-SCCH. The HS-SCCH is a physical channel that may be utilized to carry downlink control information related to the transmission of HS-DSCH. The UE may continuously monitor the HS-SCCH to determine when to read its data from the HS-DSCH, and the modulation scheme used on the assigned physical channel.

The HS-PDSCH is a physical channel that may be shared by several UEs. The HS-PDSCH may support quadrature phase shift keying (QPSK) and 16-quadrature amplitude modulation (16-QAM) and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Rel. 5 HSDPA, at any instance a UE has one serving cell, that being the strongest cell in the Active Set as according to the UE measurements of $E_c/I_0$. According to mobility procedures defined in Rel. 5 of 3GPP TS 25.331, the Radio Resource Control (RRC) signaling messages for changing the HSPDA serving cell are transmitted from the current HSDPA serving cell (i.e., the source cell), and not the cell that the UE reports as being the stronger cell (i.e., the target cell).

Figure 7:
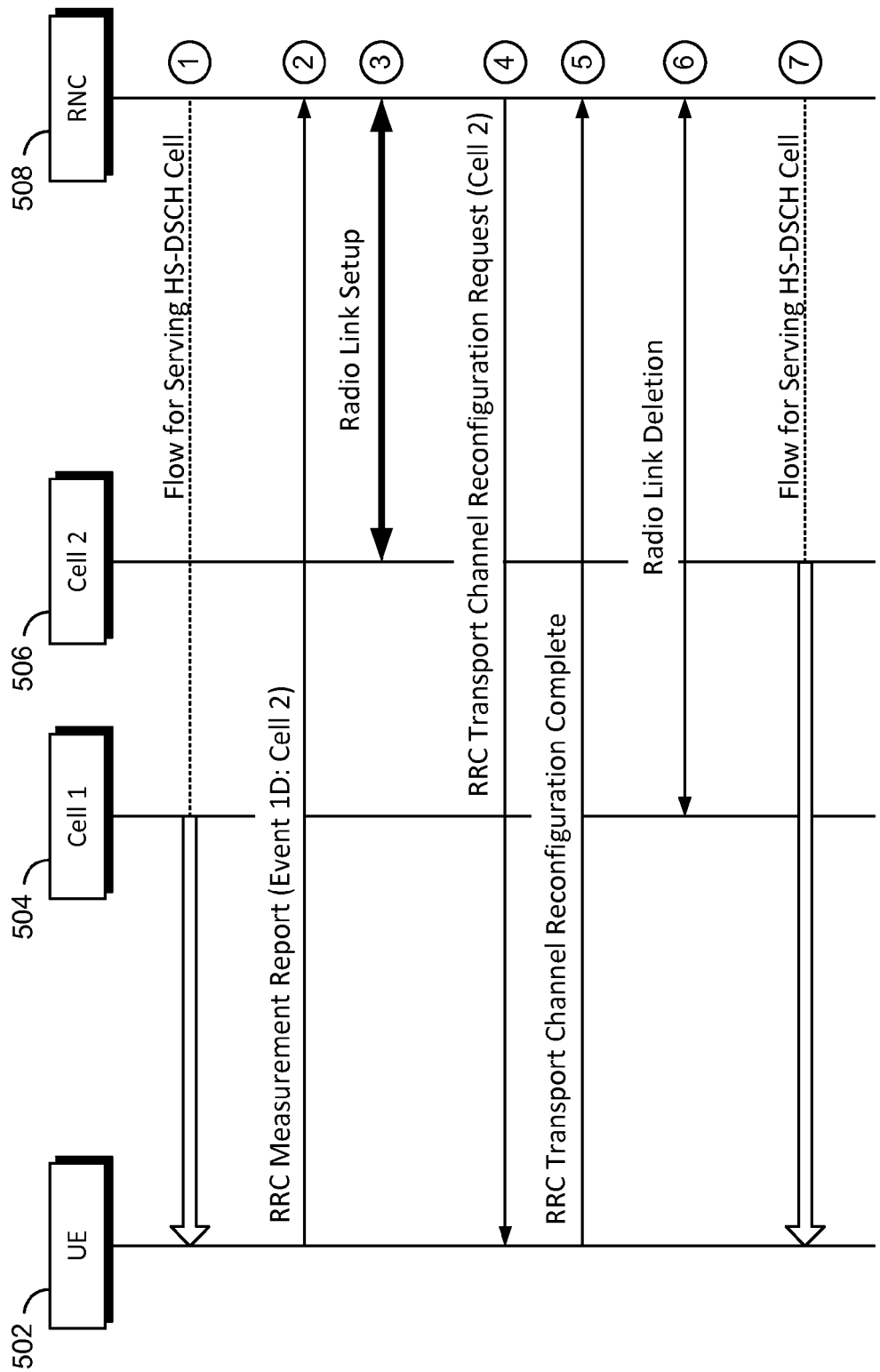
FIG. 7 is a call flow diagram illustrating an Event 1D procedure.

That is, in addition to the reporting triggers dealing with Event 1A and Event 1B, described above, for HSDPA another reporting trigger may result when a neighbor cell (which may or may not be within the Active Set) exceeds the quality of the serving HS-DSCH cell according to the UE measurements of $E_c/I_0$. In this case it may be appropriate to re-select the serving HS-DSCH cell. FIG. 7 is a simplified call flow diagram illustrating some of the signaling among nodes for Event 1D, which is the measurement event for the best serving HS- DSCH cell. In the illustrated example, at time (1) Cell 1 504 begins as the serving HS-DSCH cell. At time (2), the UE 502 may determine that Cell 2, 506, exceeds Cell 1, 504 in terms of its CPICH $E_c/I_0$. Thus, the UE 502 may transmit an RRC Measurement Report message including Event 1D and identifying Cell 2 506. In response, at time (3) the RNC 508 may transmit signaling to Cell 2 506 over the Iub interface utilizing NBAP signaling to set up a radio link with the UE 502. At time (4), the RNC 508 may send an RRC Transport Channel Reconfiguration Request to the UE 502 indicating a serving cell change, such that Cell 2, 506, will be the new serving HS-DSCH cell. The UE 502 may then respond at time (5) with an RRC Transport Channel Reconfiguration Complete message to the RNC 508. At time (6), the RNC may utilize NBAP signaling to delete the radio link setup at Cell 1 504. Thus, at time (7) HSDPA service can begin with the new serving HS-DSCH cell, i.e., Cell 2, 506.

Although some differences may exist for inter-frequency handovers, as known to those having ordinary skill in the art, those are largely outside the scope of the present disclosure and are not discussed herein.

Figure 8:
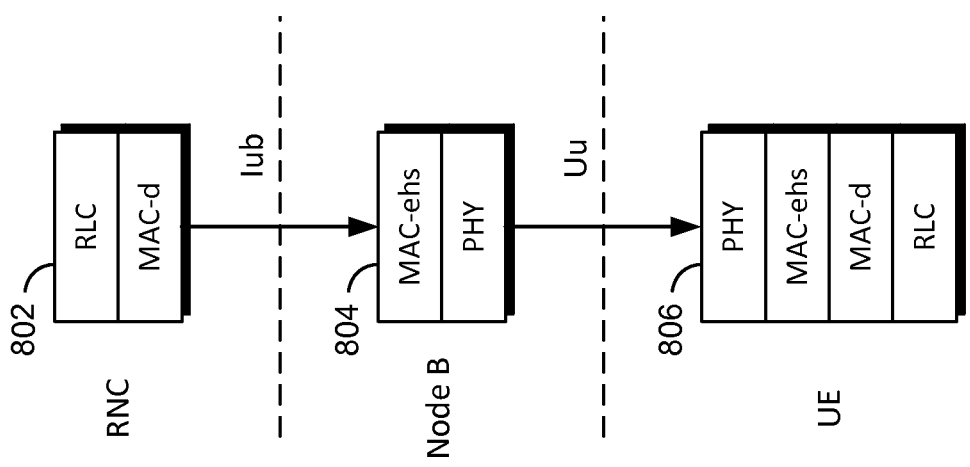
FIG. 8 is a schematic diagram illustrating a data flow in a conventional HSDPA or DC-HSDPA network.

FIG. 8 is a schematic illustration of a downlink path in an HSDPA network between an RNC 802 and a UE 806, passing through a Node B 804, showing some of the sublayers at the respective nodes. Here, the RNC 802 may be the same as the RNC 206 illustrated in FIG. 2; the Node B 804 may be the same as the Node B 208 illustrated in FIG. 2; and the UE 806 may be the same as the UE 210 illustrated in FIG. 2. The RNC 802 houses protocol layers from MAC-d and above, including for example the RLC sublayer. For the high speed channels, a MAC-hs/ehs layer is housed in the Node B 804. Further a PHY layer at the Node B 804 provides an air interface for communicating with a PHY layer at the UE 806, e.g., over an HS-DSCH.

From the UE 806 side, a MAC-d entity is configured to control access to all the dedicated transport channels, to a MAC-c/sh/m entity, and to the MAC-hs/ehs entity. Further, from the UE 806 side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

Release 8 of the 3GPP standards brought dual cell HSDPA (DC-HSDPA), which enables a UE to aggregate dual adjacent 5-MHz downlink carriers. The dual carrier approach provides higher downlink data rates and better efficiency at multicarrier sites. Generally, DC-HSDPA utilizes a primary (anchor) carrier and a secondary carrier, where the primary carrier provides the channels for downlink data transmission and the channels for uplink data transmission, and the secondary carrier provides a second set of HS-PDSCHs and HS-SCCHs for downlink communication.

In DC-HSDPA, the downlink carriers are generally provided by the same cell, and mobility is based on the primary carrier. Thus, the mobility procedures are largely the same as those utilized for single-carrier HSDPA. However, additional information may be included in the RRC handover messaging to indicate whether to use single or dual carriers after a handover to a target cell, since not all cells may support DC-HSDPA. Here, the information element (IE) in the RRC message for a handover to a DC-HSDPA-capable Node B can include information about the frequency or carrier for the secondary carrier at the target cell.

According to some aspects of the present disclosure, another form of carrier aggregation, which may be referred to as soft aggregation, provides for downlink carrier aggregation wherein the respective downlink carriers utilize the same frequency carrier. Soft aggregation strives to realize similar gains to DC-HSDPA in a single-carrier network.

Figure 9:
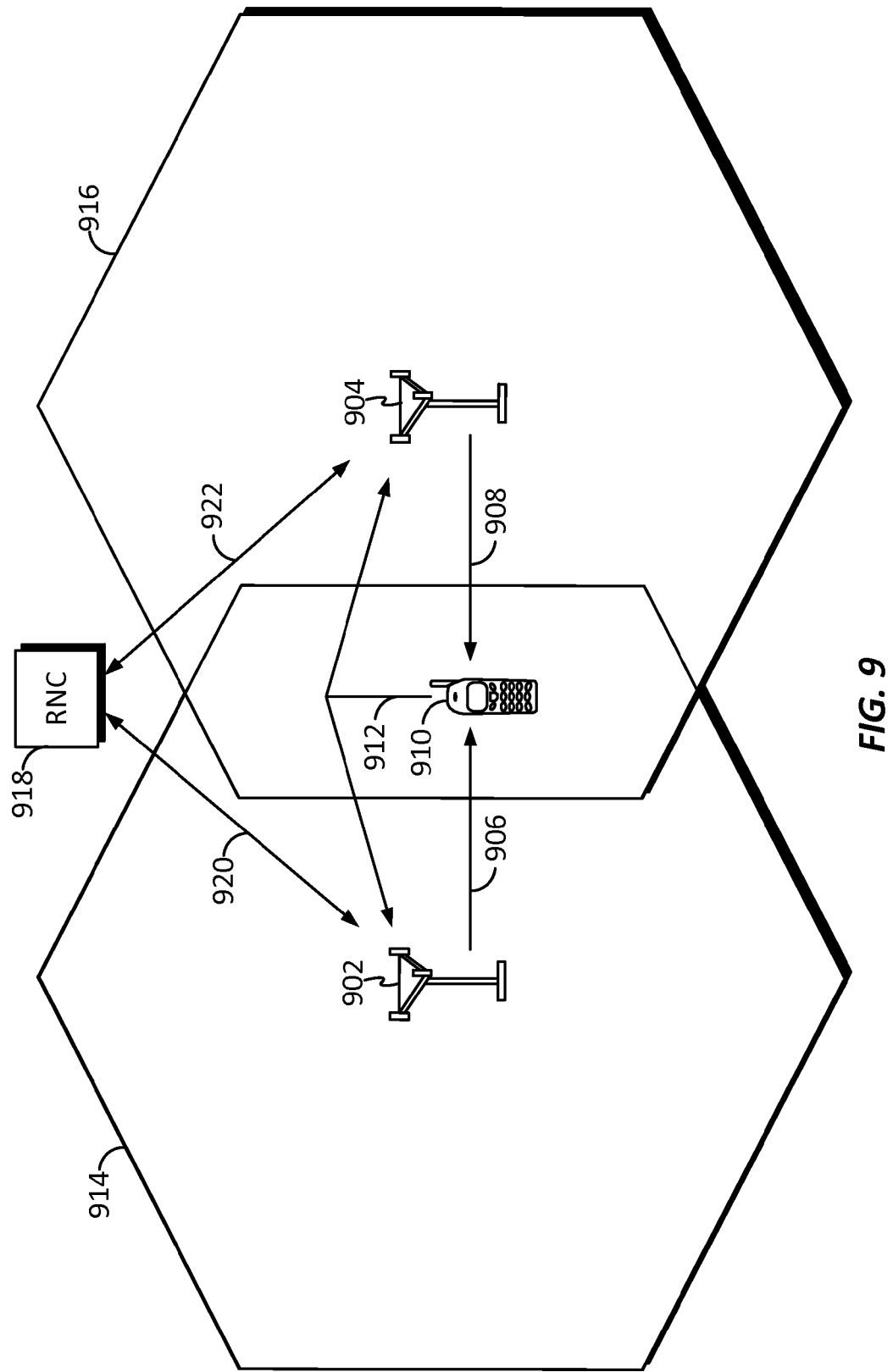
FIG. 9 is a schematic diagram illustrating a portion of a Multi-Flow HSDPA network.

FIG. 9 illustrates an exemplary system for soft aggregation in accordance with some aspects of the present disclosure. In FIG. 9, there may be a geographic overlap between two or more cells 914 and 916, such that a UE 910 may be served, at least for a certain period of time, by the multiple cells. Thus, a wireless telecommunication system in accordance with the present disclosure may provide HSDPA service from a plurality of cells on a single frequency channel, such that a UE may perform aggregation. Here, the UE may aggregate downlinks from a primary serving cell and at least one secondary serving cell. For example, a setup utilizing two or more cells may be referred to as Multi-Flow HSDPA (MF-HSDPA), coordinated multi-point HSDPA (CoMP HSDPA), or simply multi-point HSDPA. One particular configuration utilizing two cells each providing HSDPA data on the same frequency carrier is sometimes referred to as single frequency dual cell HSDPA (SF-DC-HSDPA). However, other terminology may freely be utilized. In this way, users at cell boundaries, as well as the overall system, may benefit from a high throughput. In various examples, the different cells may be provided by the same Node B, or the different cells may be provided by disparate Node Bs. That is, the cells may be from 1 or more different Node Bs and 1 or more different frequencies/carriers.

In the scheme illustrated in FIG. 9, two Node Bs 902 and 904 each provide a downlink cell 906 and 908, respectively, wherein the downlink cells are in substantially the same carrier frequency. Of course, as already described, in another example, both downlink cells 906 and 908 may be provided from different sectors of the same Node B. The UE 910 receives and aggregates the downlink cells and provides an uplink channel 912, which may be received by one or both Node Bs 902 and 904. The uplink channel 912 from the UE 910 may provide feedback information, e.g., corresponding to the downlink channel state for the corresponding downlink cells 906 and 908.

As compared to the conventional HSDPA-capable UE 806 described above in relation to FIG. 8, a DC-HSDPA-capable UE has two receive chains, each of which may be used to receive HS data from a different carrier. In a Multi-Flow HSDPA-capable UE, if the plural receive chains are made to receive HS data from different cells, at least some the benefits from aggregation can be realized in a single-carrier network.

In some aspects of the present disclosure, the cells being aggregated may be restricted to cells in the UE's Active Set. These cells may be the strongest cells in the Active Set, determined in accordance with the downlink channel quality. If the strongest cells reside in different Node B sites, this scheme may be called 'soft aggregation'. If the strongest cells to be aggregated reside in the same Node B site, this scheme may be called 'softer aggregation.'

Softer aggregation is relatively straightforward to evaluate and implement. However, since the percentage of UEs in softer handover may be limited, the gain from softer aggregation may correspondingly be limited as well. Compared to softer aggregation, soft aggregation has the potential to offer a greater benefit. However, there are various concerns related to uplink overhead channel performance and out-of-order delivery.

In a conventional DC-HSDPA or Multi-Flow HSDPA system wherein both cells are provided by a single Node B (i.e., softer aggregation), the two cells may share the same MAC-ehs entity in much the same way as the conventional HSDPA system illustrated in FIG. 8. In that configuration, because the downlink data comes to the UE 806 from a single Node B site, the RLC entity at the UE 806 may generally assume that the packets are sent in order in accordance with their respective RLC sequence numbers. Thus, any gap in sequence numbers in received packets can be understood to be caused by a packet failure, and the RLC entity at the RNC may simply retransmit all packets corresponding to the missing sequence numbers.

Figure 10:
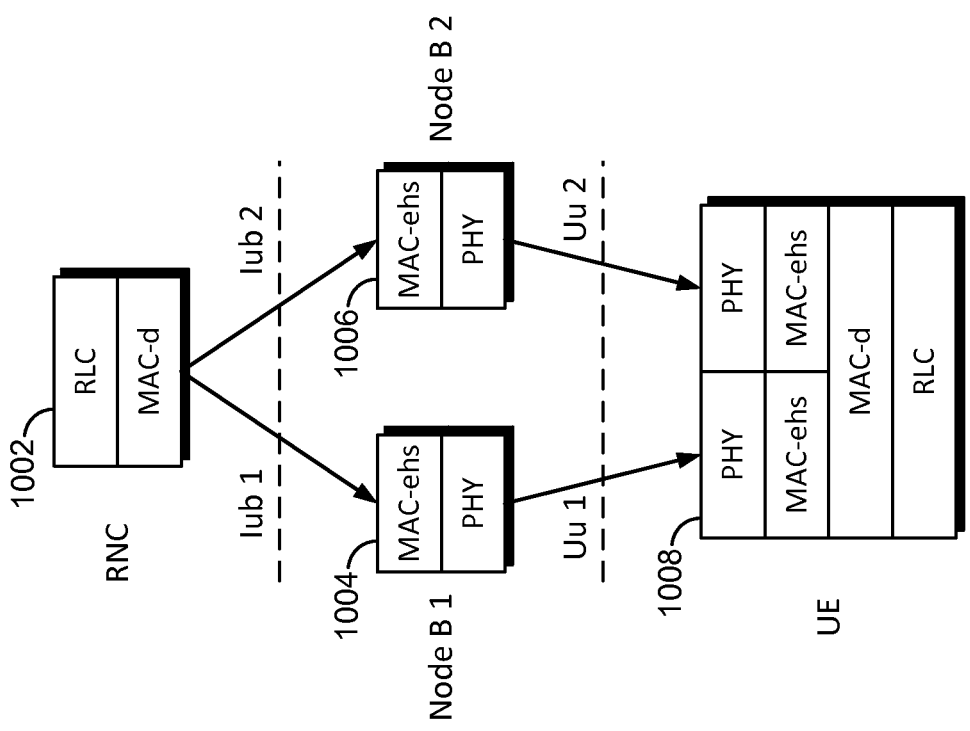
FIG. 10 is a schematic diagram illustrating a data flow in a Multi-Flow HSDPA network.

In an aspect of the present disclosure, as illustrated in FIG. 10, an RNC 1002 may include a multi-link RLC sublayer that provides packets to a plurality of Node Bs 1004 and 1006, which each provide downlink HS-transmissions to a UE 1008. Thus, the UE may be enabled for downlink aggregation, e.g., Multi-Flow HSDPA.

Here, the UE 1008 may include a plurality of MAC entities, each of the plurality of MAC entities corresponding to a different serving cell (e.g., a primary serving cell and a secondary serving cell) from corresponding Node B sites. For example, one MAC entity in the UE 1008 may correspond to the first Node B 1004 providing a primary serving cell, and a second MAC entity in the UE 1008 may correspond to the second Node B 1006 providing a secondary serving cell. Of course, for various reasons, the pairing of a particular MAC entity with a particular Node B may change over time, and the illustration is only one possible example.

Thus, the RNC 1002 may include a multi-link RLC sublayer, wherein a flow control algorithm allocates packets for the UE 1008 among the plurality of cells (e.g., at Node Bs 1004 and 1006) utilizing a plurality of RLC links, e.g., over Iub interfaces.

Figure 11:
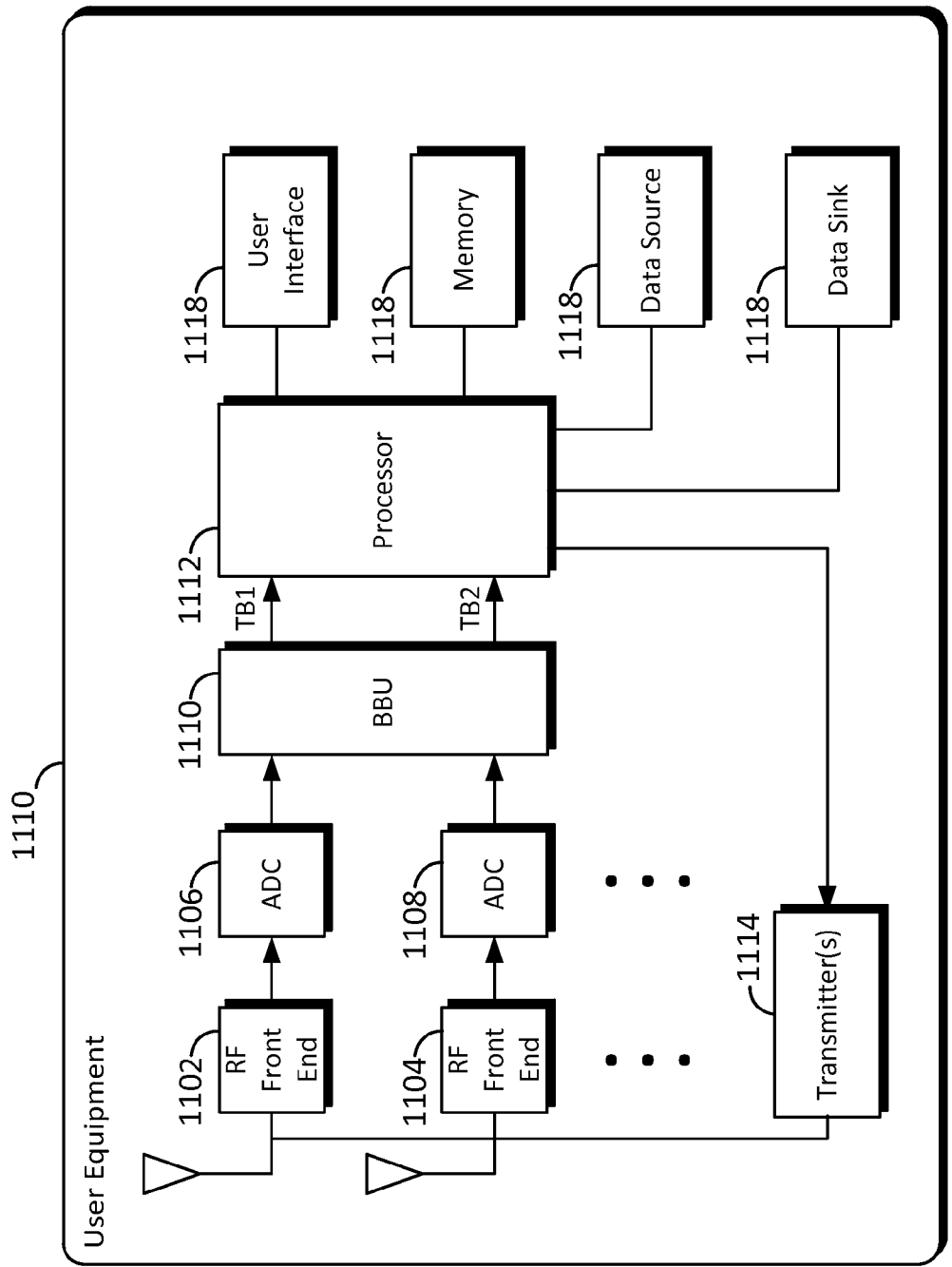
FIG. 11 is a block diagram illustrating a portion of a user equipment for use in a Multi-Flow HSDPA network.

FIG. 11 is a simplified block diagram illustrating some of the components of an exemplary UE 1110 for use in a Multi-Flow HSDPA network in accordance with some aspects of the present disclosure. In the illustration, the UE 1110 includes two receive antennas for receiving respective downlink signals, as in a SF-DC or DF-DC HSDPA network. However, within the scope of the present disclosure, a UE 1110 may include any number of antennas for receiving downlink signals in the same carrier frequency or in any suitable number of different carrier frequencies. Further, the illustrated UE 1110 shows an example for a single-band network. In a multi-carrier network where the UE is configured to receive at least one carrier in each of two or more bands, the UE would further include blocks such as a diplexer, as is known to those of ordinary skill in the art.

Coupled to each of the antennas may be a respective RF front end 1102, 1104. The RF front end may include such functional blocks as RF down-conversion, low-pass filtering, etc. The RF front end then feeds into an analog to digital converter 1106 and 1108, which may transform the received downlink channels to the digital domain to be further processed by a base-band unit or BBU 1110. The BBU 1110 may include such functional blocks as carrier/antenna separation, a base-band detector, and a base-band decoder, configured to provide the received transport blocks to a processor 1112 to be further processed in accordance with the received information. In some examples, the processor 1112 may be the same as the processing system 114 illustrated in FIG. 1. The processor 1112 may additionally be coupled to one or more transmitters 1114, which may utilize one or more of the UE's antennas as managed by a suitable duplexer. The processor 1112 may additionally utilize a memory 1118 for storing information useful for the processing of the information.

Mobility for the Multi-Flow HSDPA system as illustrated in FIG. 9 can be somewhat more involved than mobility for an HSDPA or a DC-HSDPA system, since those systems generally provide the respective HS downlink channels from a single Node B site, whereas for Multi-Flow HSDPA there may be an active link with a plurality of Node B sites.

As described above, in a conventional HSDPA or DC-HSDPA network, the UE is provided the high-speed downlink by a single serving cell (referred to as the serving HS-DSCH cell). Prior to a handover or serving cell change, the serving HS-DSCH cell may be referred to as the source cell. After the serving cell change, when the serving HS-DSCH cell is replaced (e.g., through Event 1D) by another cell, which may be referred to as the target cell, both the network and the UE generally flush any buffered data corresponding to the flow. For example, data in the HARQ buffer at the MAC layer may be flushed. This leads to data loss and generally results in an extra retransmission of the lost data by the upper layers (e.g., the RLC or TCP).

Similarly, in conventional inter-Node B SF-DC HSDPA, when anchor switching occurs (e.g., when the primary serving cell and the secondary serving cell swap), the HARQ buffer at the network side and the UE side may be flushed, leading to RLC/TCP retransmission.

Therefore, various aspects of the present disclosure provide a serving cell procedure operable in a wireless communication network configured for downlink carrier aggregation, e.g., a Multi-Flow HSDPA network, capable to reduce or eliminate the data loss described above during a serving cell change procedure.

For example, in some aspects of the present disclosure, when anchor switching occurs in a Multi-Flow HSDPA network, the network and the UE may maintain the data in HARQ buffer. This contrasts from the conventional networks, wherein this data is generally flushed, as described above. In a further aspect of the present disclosure, for the buffered data packets, the HARQ ID and TSN remain the same.

In this way, by maintaining the buffered data, all the data in HARQ buffer can be transmitted to the UE from the new serving cells after the anchor switching. Thus, the data loss associated with the serving cell change can be reduced or eliminated.

In another aspect of the disclosure relating to the anchor switching scenario described above, rather than maintaining the data in the respective buffers at the time of the anchor switch, the data in the respective buffers of the source cell and the target cell may be swapped. That is, the data buffered at the source cell may be transmitted to the target cell, and the data buffered at the target cell may be transmitted to the source cell. As an illustrative example, referring to FIG. 9, the source Node B 902 may transmit its buffered data over the Iub interface 920 to the RNC 918, and the RNC 918 may accordingly forward the information over the Iub interface 922 to the target Node B 904. Further, the target Node B 904 may transmit its buffered data over the Iub interface 922 to the RNC 918, and the RNC 918 may accordingly forward the information over the Iub interface 920 to the source Node B 902. In this way, following the anchor switch, the Node Bs 902 and 904 may accordingly transmit the data to the UE 910 in a way that maintains the flow corresponding to the anchor carrier and the secondary carrier.

In a further aspect of the present disclosure, the above processes can be generalized to apply to other mobility events in a network configured for downlink carrier aggregation, e.g., a Multi-Flow HSDPA network. For example, a paradigm may be established for a serving cell change, wherein buffered data at the Node B and at the UE may be maintained, rather than flushed, if the Node B remains as a serving HS-DSCH cell following the serving cell change. However, if the Node B is removed as a serving HS-DSCH cell during the course of the serving cell change procedure, the buffered data may be flushed. In another example, the buffered data may be transferred to another Node B, e.g., utilizing backhaul connections, wherein the Node B to which the buffered data is transferred, performs as a serving HS-DSCH cell following the serving cell change.

Such a paradigm can apply when removing a primary serving HS-DSCH cell or a secondary serving HS-DSCH cell from the set of serving cells; or when adding a primary serving HS-DSCH cell or a secondary serving HS-DSCH cell from the set of serving cells. Of course, in various examples, there may be any number of serving HS-DSCH cells, providing a downlink carrier to the UE in any one or more carrier frequencies, according to the capabilities of the UE and the network.

Table 1 below illustrates a set of mobility events for an exemplary SF-DC HSDPA network, wherein two downlink carriers are provided at any given time by two disparate Node Bs, utilizing the same carrier frequency. However, this is by way of example only and the serving cells may be from 1 or more different Node Bs and 1 or more different frequencies/carriers.

In the table, three different Node Bs are designated respectively as X, Y, and Z. On columns towards the left, Node Bs labeled X and Y are shown to act as serving cells before a mobility event or serving cell change. Immediately to the right of these columns are shown which Node Bs act as serving cells after the mobility event or serving cell change. Finally, to the right of the table are illustrated the cell designators representing the Node Bs having one or more buffers corresponding to the flow flushed. As described above, if a Node B acted as a serving cell prior to the serving cell change, and also acts as a serving cell after the serving cell change, its buffers, e.g., a HARQ buffer, are not flushed.

TABLE 1 mobility events in SF-DC

| Mobility event | Serving cells before mobility event | | Serving cells after mobility event | | Cell flushed | Cell doesn't flush |
|---|---|---|---|---|---|---|
| | Primary cell | Secondary cell | Primary cell | Secondary cell | | |
| Anchor switching (1D) | X | Y | Y | X | None | X, Y |
| Changing secondary cell (E1D') | X | Y | X | Z | Y | X |
| Changing primary cell (E1D) | X | Y | Z | X | Y | X |
| Changing primary cell (E1D) | X | Y | Y | Z | X | Y |
| Changing primary cell (E1D) | X | Y | Z | Y | X | Y |
| Removing a serving cell (E1B) | X | Y | X | None | Y | X |
| Removing a serving cell (E1B) | X | Y | Y | None | X | Y |

Changing Secondary Cell (Event 1D')

Figure 12:
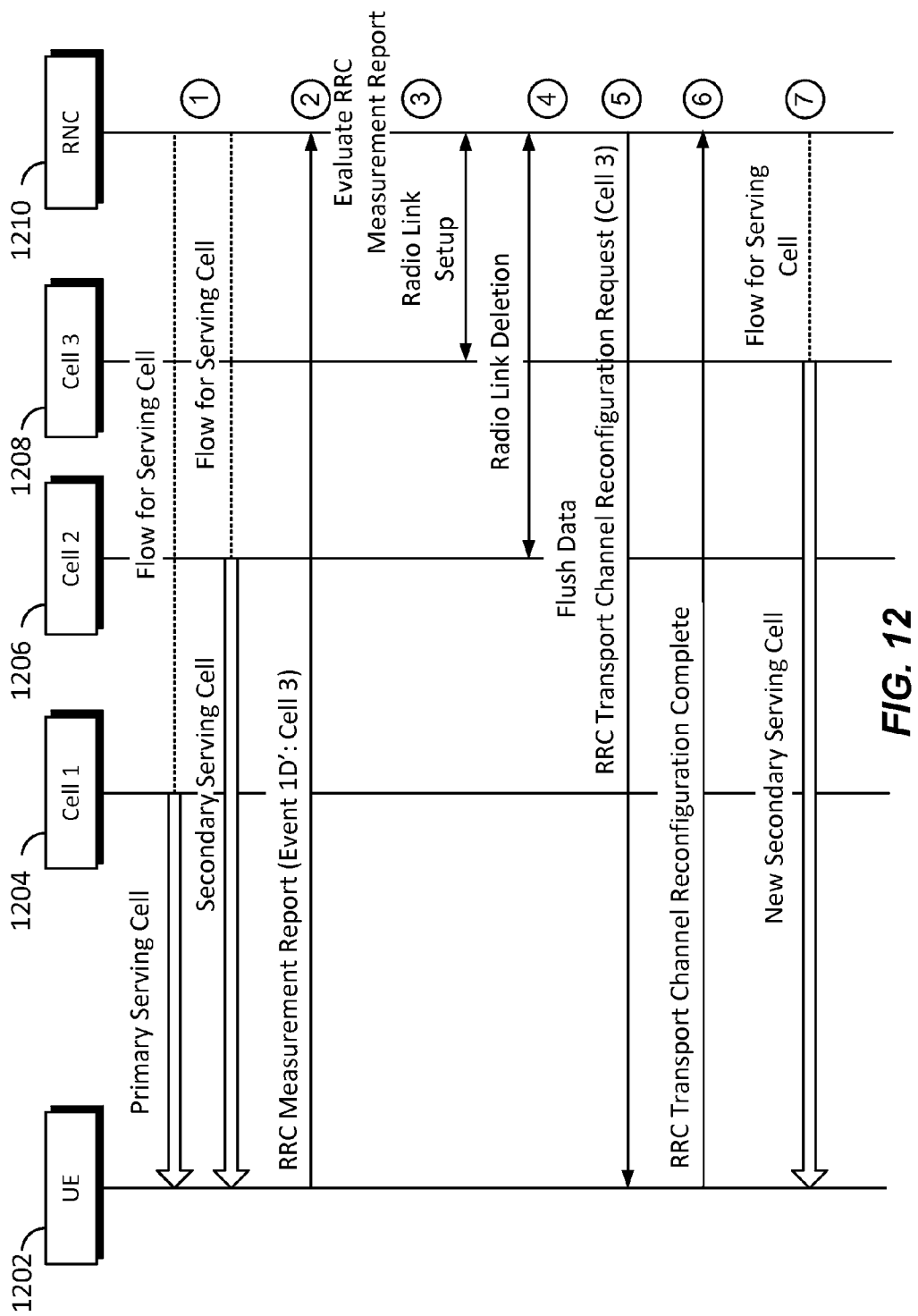
FIG. 12 is a simplified call flow diagram illustrating some of the signaling among nodes for an Event 1D', which is the measurement event for the best primary and secondary serving cells, according to one example.

FIG. 12 is a simplified call flow diagram illustrating some of the signaling among nodes for an Event 1D', which is the measurement event for the best primary and secondary serving cells, according to one example. As discussed above, the serving cells may be from one or more different Node Bs and one or more different frequencies/carriers.

In the illustrated example, at time (1) Cell 1 1204 begins as the first or primary serving cell and Cell 2 1206 begins as the second or secondary serving cell. Cell 3 1208 is a neighboring cell for which the UE may monitor and measure its cell quality. Neighboring cells may or may not be within the Active Set. At time (2), the UE 1202 may determine that Cell 3 1208 exceeds Cell 2 1206 in terms of its cell quality (or CPICH $E_c/I_0$) but fails to exceed Cell 1 1202 in terms of its cell quality. Thus, the UE 1202 may transmit an RRC Measurement Report message including Event 1D' and identifying Cell 3 1208. In response, at time (3) the RNC 1210 may evaluate the RRC Measurement Report message and transmit signaling to Cell 3 1208 over the Iub interface utilizing NBAP signaling to set up a radio link with the UE 1202. At time (4), the RNC 1210 may then transmit NBAP signaling over the Iub interface to Cell 2 1206 to delete the radio link between Cell 2 1206 and the UE 1202 and flush any buffered data in a queue within Cell 2 1206 corresponding to the flow. At time (5), the RNC 1210 may send an RRC Transport Channel Reconfiguration Request to the UE 1202 indicating a serving cell change, such that Cell 3 1208 will be the new secondary serving cell while Cell 1 1204 will remain as the primary serving cell. The UE 1202 may then respond at time (6) with an RRC Transport Channel Reconfiguration Complete message to the RNC 1210. Thus, at time (7) HSDPA service can begin with Cell 3 1208 as the new secondary serving cell.

In other words, when a mobility Event 1D' has occurred, Cell 1 1204 (which is the primary serving cell or Cell X in Table 1 above) continues to serve as the primary serving cell as it is the strongest cell in the Active Set and Cell 3 1208 (which is a neighboring serving cell or Cell Z in Table 1 above) is the new secondary serving cell as Cell 3 1208 is a stronger serving cell then Cell 2 1206 (the original secondary cell or Cell Y in Table 1 above), but weaker than the original primary serving cell, Cell 1 1204. Since Cell 3 1208 is a stronger cell than Cell 2 1206, Cell 3 1208 may replace Cell 2 1206 as the secondary serving cell. As Cell 1 1204 remains as the primary serving cell following the secondary serving cell change, the buffered data at Cell 1 1204 and at the UE may be maintained, rather than flushed. As Cell 2 1206 has been replaced as the second serving cell by Cell 3 1208 and is no longer acting as a serving cell, the buffered data stored in Cell 2 1206 is flushed.

Changing Primary Cell (Event 1D)-First Example

Figure 13:
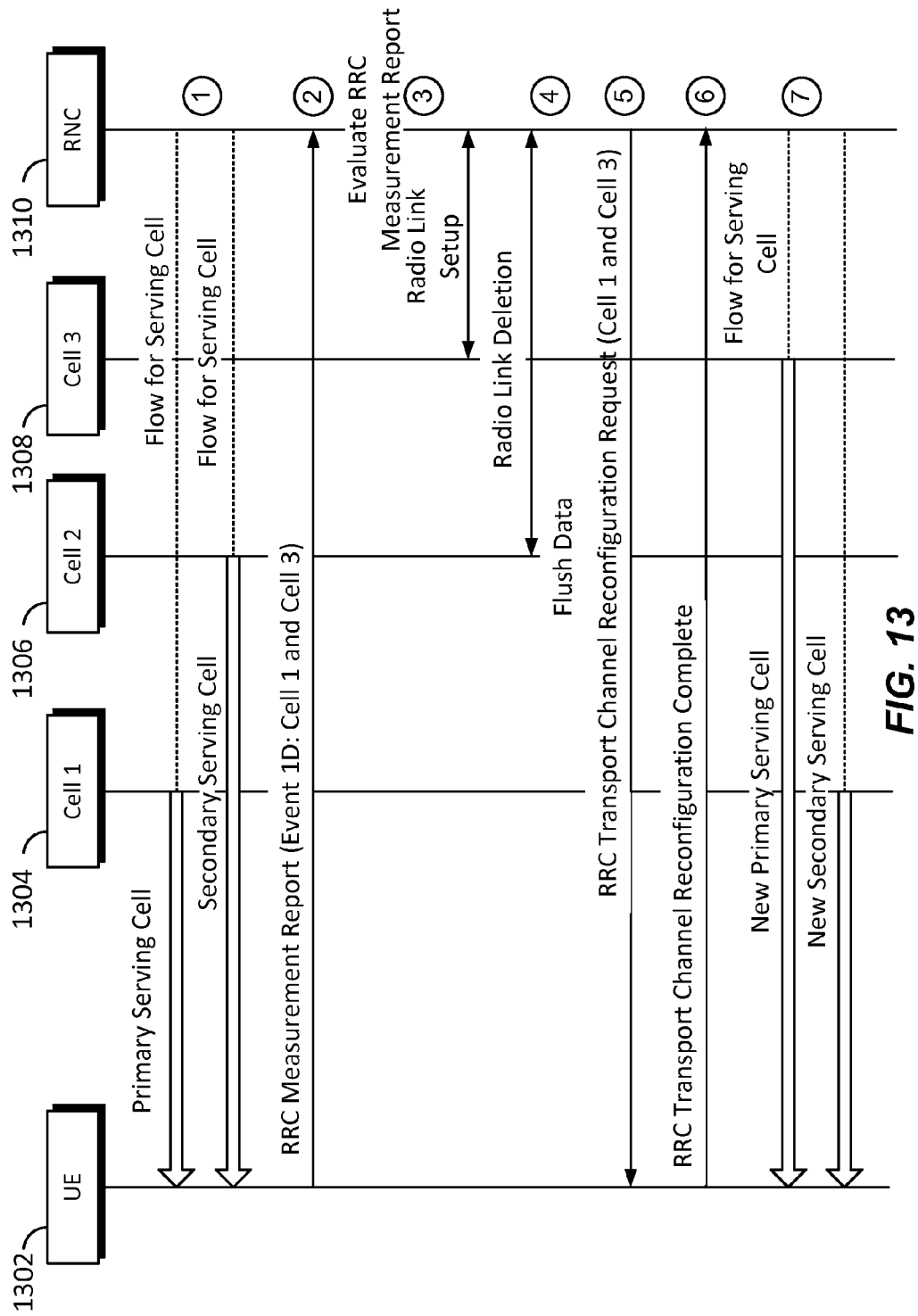
FIG. 13 is a simplified call flow diagram illustrating some of the signaling among nodes for an Event 1D, which is the measurement event for the best primary and secondary serving cells, according to one example.

FIG. 13 is a simplified call flow diagram illustrating some of the signaling among nodes for an Event 1D, which is the measurement event for the best primary and secondary serving cells, according to one example. As discussed above, the serving cells may be from one or more different Node Bs and one or more different frequencies/carriers.

In the illustrated example, at time (1) Cell 1 1304 begins as the primary serving cell and Cell 2 1306 begins as the secondary serving cell. Cell 3 1308 is a neighboring cell for which the UE may monitor and measure its cell quality. Neighboring cells may or may not be within the Active Set. At time (2), the UE 1302 may determine that Cell 3 1308 exceeds Cell 1 1304 and Cell 2 1306, in terms of its cell quality (or CPICH $E_c/I_0$) while Cell 1 1304 still exceeds the cell quality of Cell 2 1306. Thus, the UE 1302 may transmit an RRC Measurement Report message including Event 1D and identifying that the cell quality of Cell 3 1308 exceeds the cell quality of Cell 1 1304 and Cell 2 1306 while the cell quality of Cell 1 1304 still exceeds the cell quality of Cell 2 1306. In response, at time (3) the RNC 1310 may evaluate the RRC Measurement Report message and transmit signaling to Cell 3 1308 over the Iub interface utilizing NBAP signaling to set up a radio link with the UE 1302. At time (4), the RNC 1310 may then transmit NBAP signaling over the Iub interface to Cell 2 1306 to delete the radio link between Cell 2 1306 and the UE 1302 and flush any buffered data in Cell 2 1306 corresponding to the flow. At time (5), the RNC 1310 may send an RRC Transport Channel Reconfiguration Request to the UE 1302 indicating a serving cell change, such that Cell 3 1308 will be the new primary serving cell while Cell 1 1304 will be the new secondary serving cell. The UE 1302 may then respond at time (6) with an RRC Transport Channel Reconfiguration Complete message to the RNC 1310. Thus, at time (7) HSDPA service can begin with Cell 3 1308 as the new primary serving cell and Cell 1 1304 as the new secondary serving cell. As Cell 1 1304 remains as a serving cell, the buffered data at Cell 1 1304 and at the UE may be maintained, i.e. not flushed.

In other words, when a mobility Event 1D has occurred, Cell 1 1304 (which is the primary serving cell or Cell X in Table 1 above) and Cell 2 1306 the original secondary cell or Cell Y in Table 1 above) are replaced. Cell 1 1304 is replaced with Cell 3 1308 (which is a neighboring serving cell or Cell Z in Table 1 above) and Cell 1 1304, which is now the second strongest cell, becomes the new secondary serving cell and replaces Cell 2 1306. That is, Cell 3 1308 becomes the new primary serving cell replacing Cell 1 1304, while Cell 1 1304 becomes the new secondary serving cell replacing Cell 2 1306. As Cell 1 1304 is serving as the secondary serving cell, the buffered data at Cell 1 1304 and at the UE may be maintained, rather than flushed and as Cell 2 1306 has been replaced as the second serving cell by Cell 1 1304 and is no longer acting as a serving cell, the buffered data stored in Cell 2 1306 is flushed.

Changing Primary Cell (Event 1D) - Second Example

Figure 14:
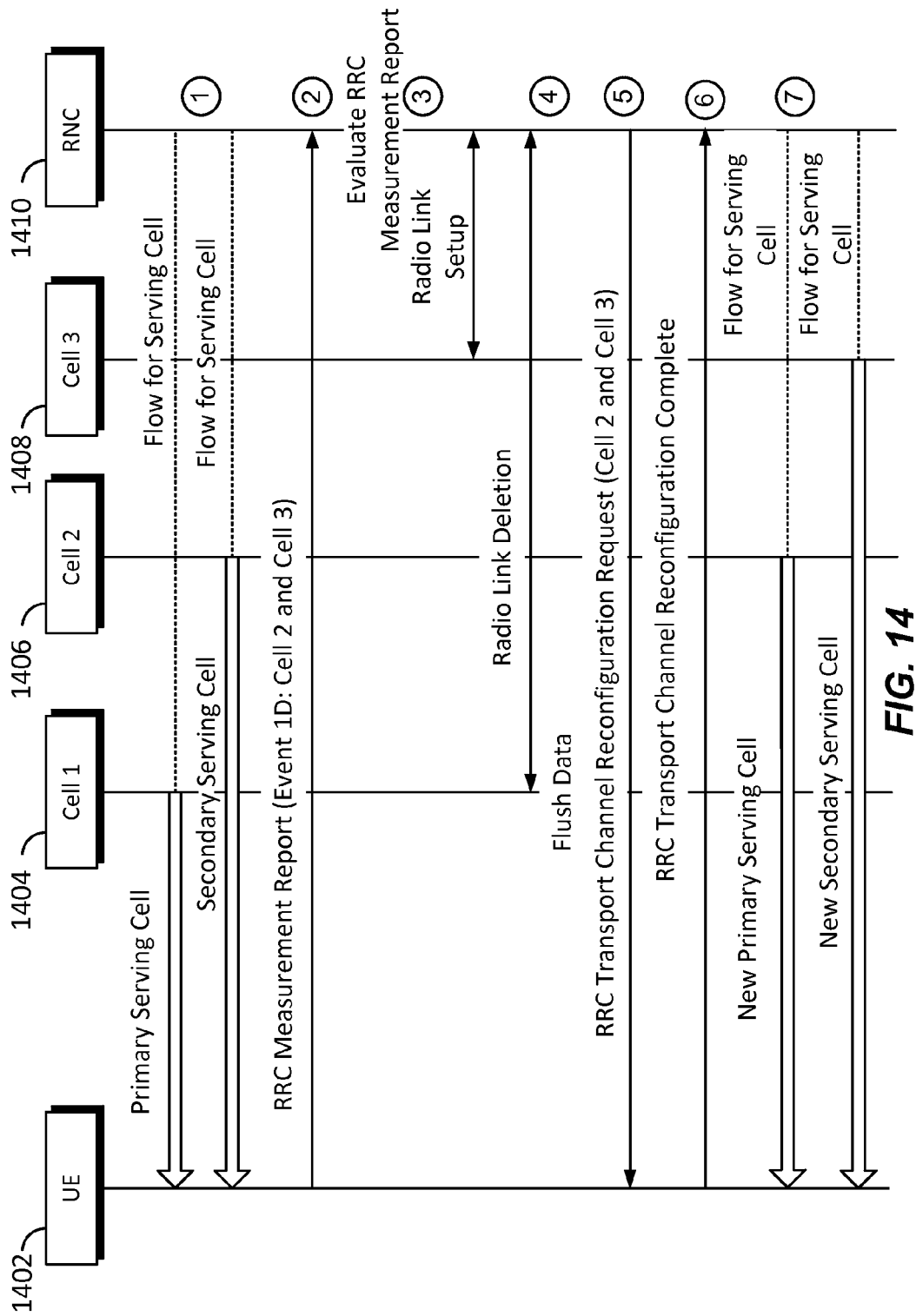
FIG. 14 is a simplified call flow diagram illustrating some of the signaling among nodes for an Event 1D, which is the measurement event for the best primary and secondary serving cells, according to one example.

FIG. 14 is a simplified call flow diagram illustrating some of the signaling among nodes for an Event 1D, which is the measurement event for the best primary and secondary serving cells, according to one example. As discussed above, the serving cells may be from one or more different Node Bs and one or more different frequencies/carriers.

In the illustrated example, at time (1) Cell 1 1404 begins as the primary serving cell and Cell 2 1406 begins as the secondary serving cell. Cell 3 1408 is a neighboring cell for which the UE may monitor and measure its cell quality. Neighboring cells may or may not be within the Active Set. At time (2), the UE 1402 may determine that Cell 3 1408 exceeds Cell 1 1404 in terms of its cell quality (or CPICH $E_c/I_0$) while Cell 2 1406 still exceeds the cell quality of Cell 3 1408. Thus, the UE 1402 may transmit an RRC Measurement Report message including Event 1D and identifying that the cell quality of Cell 3 1408 exceeds the cell quality of Cell 1 1404 while the cell quality of Cell 2 1406 still exceeds the cell quality of Cell 3 1408. In response, at time (3) the RNC 1410 may evaluate the RRC Measurement Report message and transmit signaling to Cell 3 1408 over the Iub interface utilizing NBAP signaling to set up a radio link with the UE 1402. At time (4), the RNC 1410 may then transmit NBAP signaling over the Iub interface to Cell 1 1404 to delete the radio link between Cell 1 1406 and the UE 1402 and flush any buffered data in Cell 1 1406 corresponding to the flow as it is no longer acting as a serving cell. At time (5), the RNC 1410 may send an RRC Transport Channel Reconfiguration Request to the UE 1402 indicating a serving cell change, such that Cell 2 1406, will be the new primary serving cell while Cell 3 1408 will be the new secondary serving cell. The UE 1402 may then respond at time (6) with an RRC Transport Channel Reconfiguration Complete message to the RNC 1410. Thus, at time (7) HSDPA service can begin with Cell 2 1406 as the new primary serving cell and Cell 3 1408 as the new secondary serving cell. As Cell 2 1406 remains as a serving cell, the buffered data at Cell 2 1406 and at the UE may be maintained, i.e. not flushed.

In other words, when a mobility Event 1D has occurred, Cell 1 1404 (which is the primary serving cell or Cell X in Table 1 above) and Cell 2 1406 the original secondary cell or Cell Y in Table 1 above) are replaced. Cell 1 1404 is replaced with Cell 2 1406 and Cell 3 1408 (which is the neighboring serving cell or Cell Z in Table 1 above) which is now the second strongest cell, becomes the new secondary serving cell and replaces Cell 2 1406. That is, Cell 2 1406 becomes the new primary serving cell replacing Cell 1 1404 while Cell 3 1408 becomes the new secondary serving cell replacing Cell 2 1406. As Cell 1 1404 is no longer serving the UE, the buffered data at Cell 1 1404 is flushed, while the buffered data stored in Cell 2 1406 and at the UE may be maintained.

Changing Primary Cell (Event 1D) - Third Example

Figure 15:
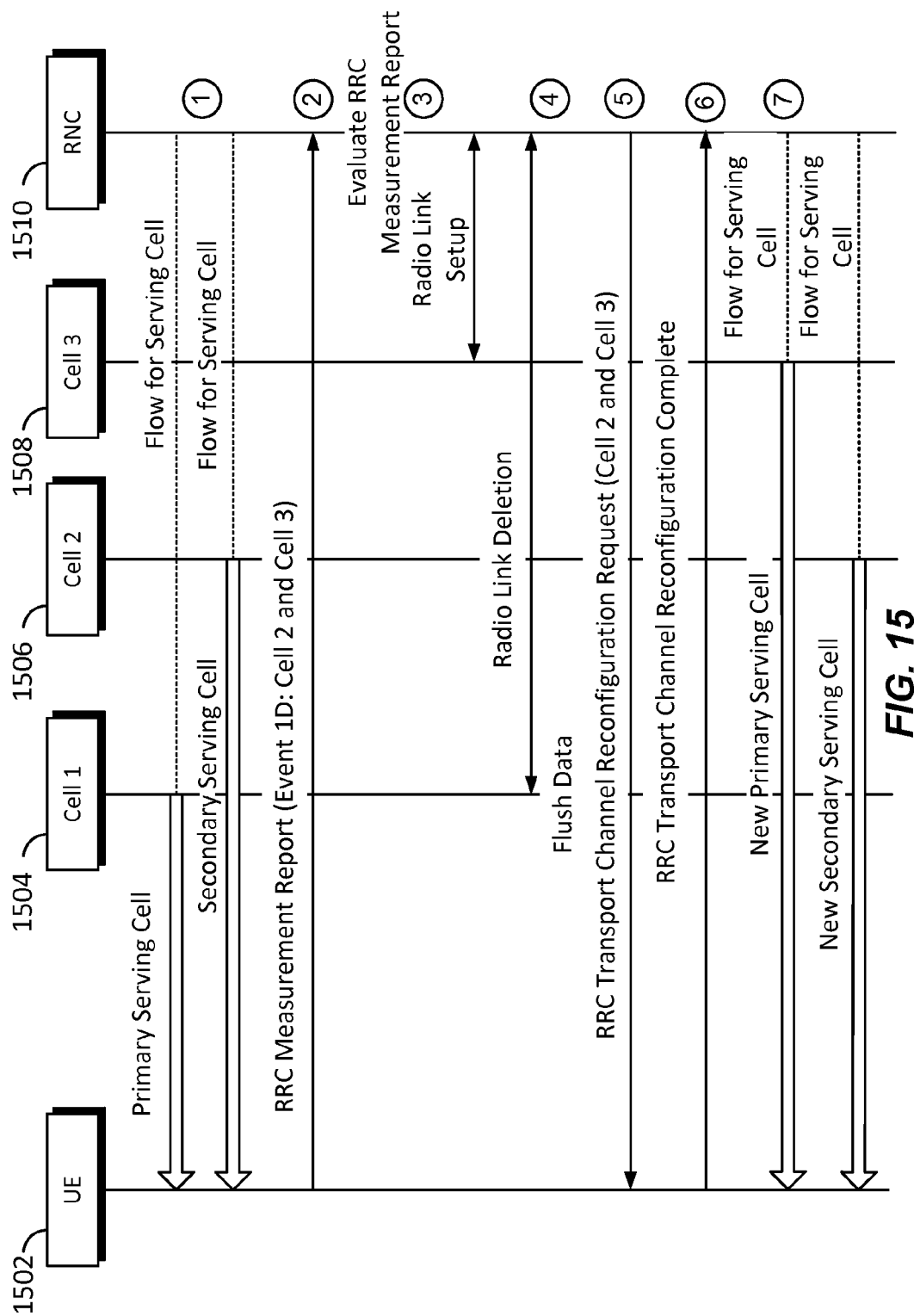
FIG. 15 is a simplified call flow diagram illustrating some of the signaling among nodes for an Event 1D, which is the measurement event for the best primary and secondary serving cells, according to one example.

FIG. 15 is a simplified call flow diagram illustrating some of the signaling among nodes for an Event 1D, which is the measurement event for the best primary and secondary serving cells, according to one example. As discussed above, the serving cells may be from one or more different Node Bs and one or more different frequencies/carriers.

In the illustrated example, at time (1) Cell 1 1504 begins as the primary serving cell and Cell 2 1506 begins as the secondary serving cell. Cell 3 1508 is a neighboring cell for which the UE may monitor and measure its cell quality. Neighboring cells may or may not be within the Active Set. At time (2), the UE 1502 may determine that Cell 3 1508 exceeds Cell 1 1504 and Cell 2 1506 in terms of its cell quality (or CPICH $E_c/I_0$) while Cell 2 1506 now exceeds the cell quality of Cell 1 1502. Thus, the UE 1502 may transmit an RRC Measurement Report message including Event 1D and identifying that the cell quality of Cell 3 1508 exceeds the cell quality of Cell 1 1504 and Cell 2 1506 while the cell quality of Cell 2 1506 now exceeds the cell quality of Cell 1 1508. In response, at time (3) the RNC 1510 may evaluate the RRC Measurement Report message and transmit signaling to Cell 3 1508 over the Iub interface utilizing NBAP signaling to set up a radio link with the UE 1502. At time (4), the RNC 1510 may then transmit NBAP signaling over the Iub interface to Cell 1 1504 to delete the radio link between Cell 1 1504 and the UE 1502 and flush any buffered data in Cell 1 1502 corresponding to the flow as Cell 1 1502 is no longer acting as a serving cell. At time (5), the RNC 1510 may send an RRC Transport Channel Reconfiguration Request to the UE 1502 indicating a serving cell change, such that Cell 3 1508 will be the new primary serving cell while Cell 2 1506 will remain as the secondary serving cell. The UE 1502 may then respond at time (6) with an RRC Transport Channel Reconfiguration Complete message to the RNC 1510. Thus, at time (7) HSDPA service can begin with Cell 3 1508 as the new primary serving cell and Cell 2 1506 remaining as the secondary serving cell. As Cell 2 1506 remains as a serving cell, the buffered data at Cell 2 1506 and at the UE may be maintained, i.e. not flushed.

In other words, when a mobility Event 1D has occurred, Cell 1 1504 (which is the primary serving cell or Cell X in Table 1 above) is replaced and Cell 2 1506 (which is the original secondary cell or Cell Y in Table 1 above) remains unchanged. Cell 1 1504 is replaced with Cell 3 1508 (which is the neighboring serving cell or Cell Z in Table 1 above) which is now the strongest cell while Cell 2 1506 remains as the secondary serving cell. That is, Cell 3 1508 becomes the new primary serving cell replacing Cell 1 1504 while Cell 2 1506 remains as the secondary serving cell. As Cell 1 1504 is no longer serving the UE, the buffered data at Cell 1 1504 is flushed, while the buffered data stored in Cell 2 1506 and at the UE may be maintained.

Removing a Serving Cell (Event 1B) - First Example

Figure 16:
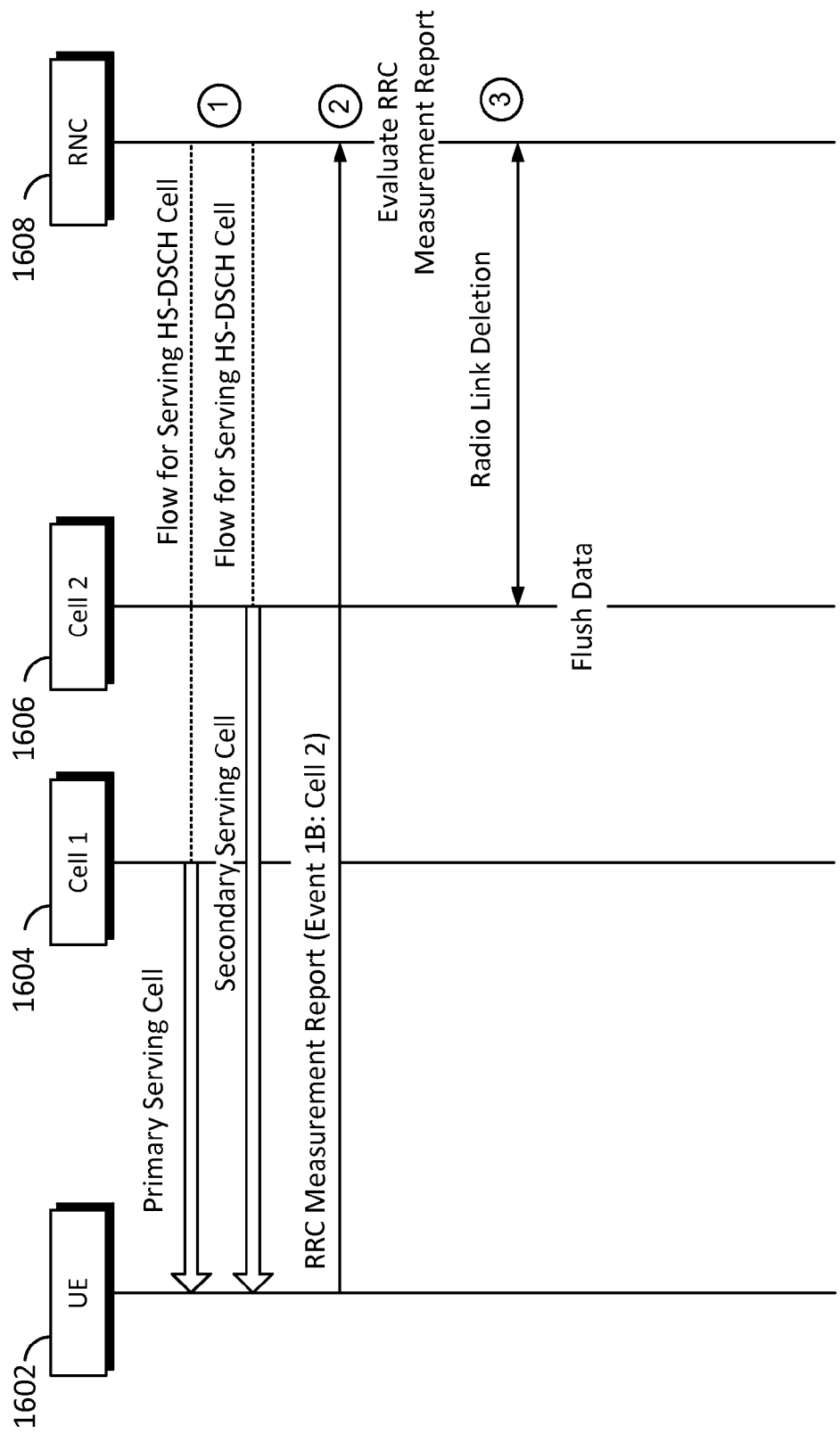
FIG. 16 is a simplified call flow diagram illustrating some of the signaling among nodes for an Event 1B, which is the measurement event for the best primary serving cell, according to one example.

FIG. 16 is a simplified call flow diagram illustrating some of the signaling among nodes for an Event 1B, which is the measurement event for the best primary serving cell, according to one example. As discussed above, the serving cells may be from one or more different Node Bs and one or more different frequencies/carriers.

In the illustrated example, at time (1) Cell 1 1604 begins as the primary serving cell and Cell 2 1606 begins as the secondary serving cell. At time (2), the UE 1602 may determine that Cell 1 1604 still exceeds all other cells in terms of its cell quality (or CPICH $E_c/I_0$). Thus, the UE 1602 may transmit an RRC Measurement Report message including Event 1B and identifying that the cell quality of Cell 1 1604 still exceeds the cell quality of Cell 2 1606. Additionally, the cell quality of Cell 2 1606 may be determined to exceed a predetermined threshold, fall below a predetermined threshold or leave a reporting range. In response, at time (3) the RNC 1610 may evaluate the RRC Measurement Report message and transmit NBAP signaling over the Iub interface to Cell 2 1606 to delete the radio link between Cell 2 1606 and the UE 1602 and flush any buffered data in Cell 2 1606 corresponding to the flow.

In other words, when a mobility Event 1B has occurred, Cell 1 1604 (which is the primary serving cell or Cell X in Table 1 above) remains as the primary serving cell and Cell 2 1606 (which is the original secondary serving cell or Cell Y in Table 1 above) is removed, i.e. its link with the UE is deleted. A new secondary serving cell is not assigned. As Cell 2 1606 is no longer serving the UE, the buffered data at Cell 2 1606 is flushed, while the buffered data stored in Cell 1 1604 and at the UE may be maintained.

Removing a Serving Cell (Event 1B) - Second Example

Figure 17:
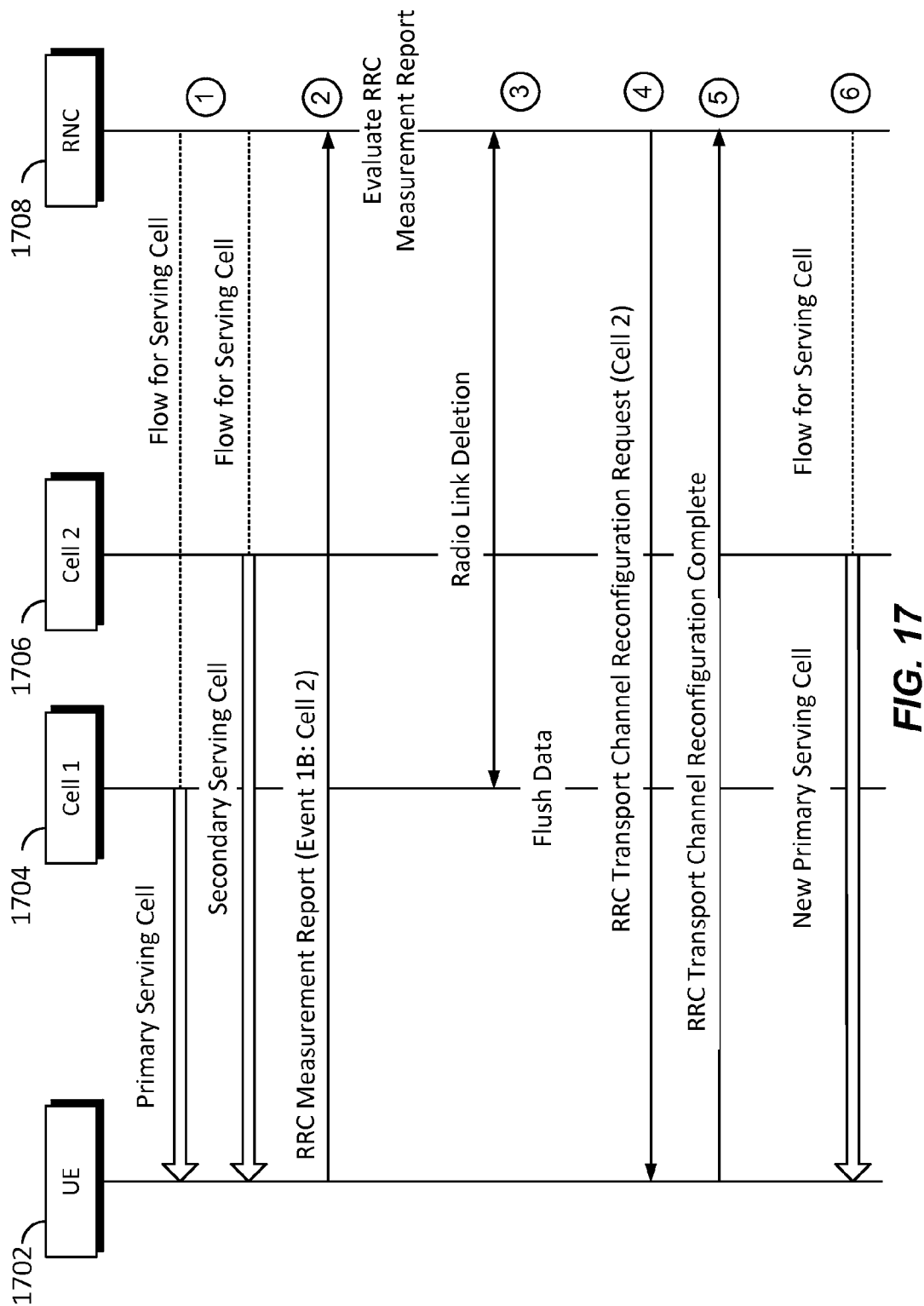
FIG. 17 is a simplified call flow diagram illustrating some of the signaling among nodes for an Event 1B, which is the measurement event for the best primary serving cell, according to one example.

FIG. 17 is a simplified call flow diagram illustrating some of the signaling among nodes for an Event 1B, which is the measurement event for the best primary serving cell, according to one example. As discussed above, the serving cells may be from one or more different Node Bs and one or more different frequencies/carriers.

In the illustrated example, at time (1) Cell 1 1704 begins as the primary serving cell and Cell 2 1706 begins as the secondary serving cell. At time (2), the UE 1702 may determine that Cell 2 1706 now exceeds Cell 1 1704 and all other cells in terms of its cell quality (or CPICH $E_c/I_0$). Thus, the UE 1702 may transmit an RRC Measurement Report message including Event 1B and identifying that the cell quality of Cell 2 1706 now exceeds the cell quality of Cell 1 1704. Additionally, the cell quality of Cell 1 1704 may be determined to exceed a predetermined threshold, fall below a predetermined threshold or leave a reporting range. In response, at time (3) the RNC 1710 may evaluate the RRC Measurement Report message and transmit NBAP signaling over the Iub interface to Cell 1 1704 to delete the radio link between Cell 1 1704 and the UE 1702 and flush any buffered data in Cell 7 1704 corresponding to the flow. At time (4), the RNC 1710 may send an RRC Transport Channel Reconfiguration Request to the UE 1702 indicating a serving cell change, such that Cell 2 1706 will be the new primary serving cell and that the link with Cell 1 1704 has been deleted. The UE 1702 may then respond at time (5) with an RRC Transport Channel Reconfiguration Complete message to the RNC 1710. Thus, at time (6) HSDPA service can begin with Cell 2 1706 as the new primary serving cell. As Cell 2 1706 remains as a serving cell, the buffered data at Cell 2 1706 and at the UE may be maintained, i.e. not flushed.

In other words, when a mobility Event 1B has occurred, Cell 2 1706 (which is the secondary serving cell or Cell Y in Table 1 above) becomes the new primary serving cell and Cell 1 1704 (which is the original primary serving cell or Cell X in Table 1 above) is removed, i.e. its link with the UE is deleted. A new secondary serving cell is not assigned. As Cell 1 1704 is no longer serving the UE, the buffered data at Cell 1 1704 is flushed, while the buffered data stored in Cell 2 1706 and at the UE may be maintained.

Figure 18:
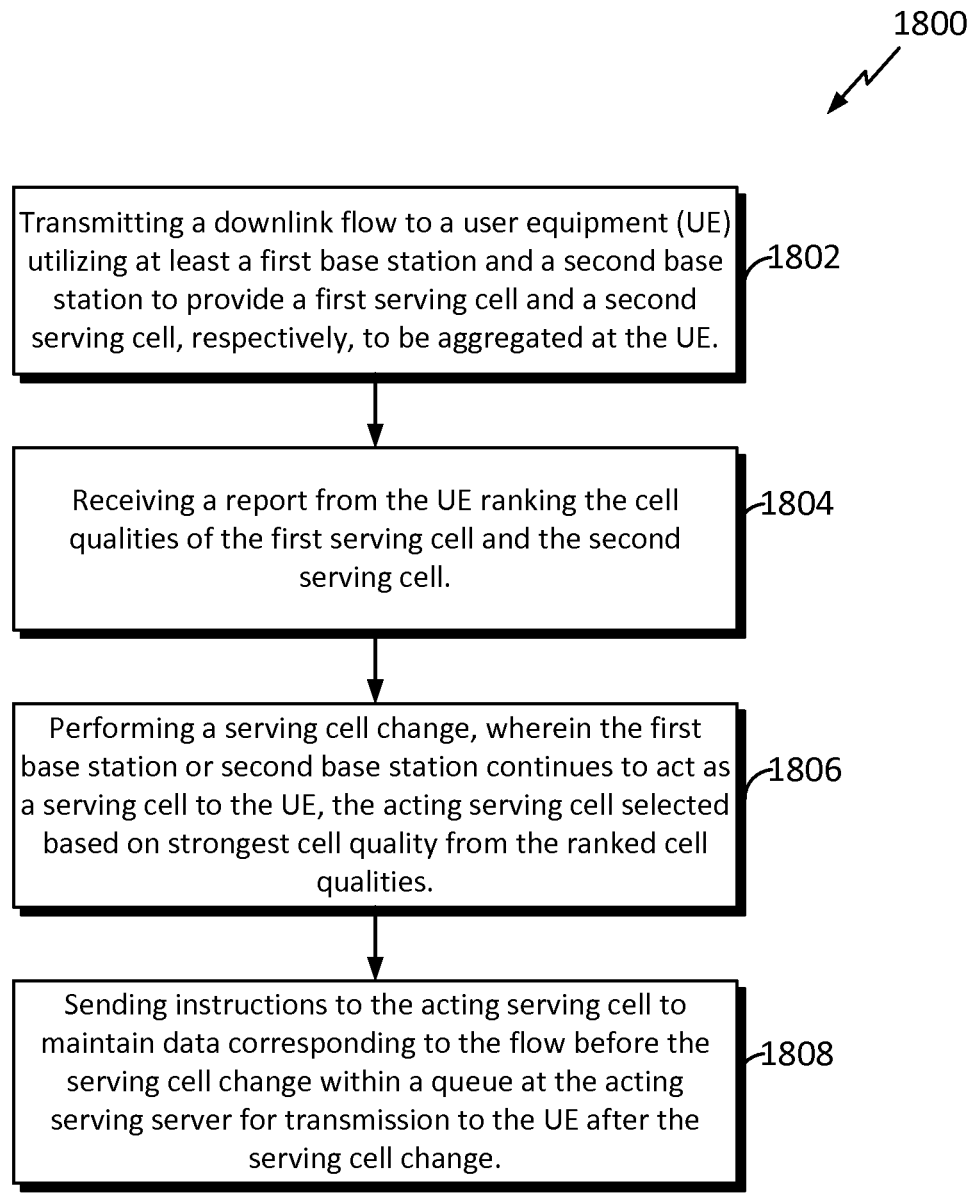
FIG. 18 is a flow chart illustrating a process for reducing data loss during a serving cell change in a Multi-flow HSPDA communication network.

FIG. 18 is a flow chart illustrating a process, operational at a RNC in a UTRAN, for reducing data loss during a serving cell change in a Multi-flow HSPDA communication network.

First, a downlink flow may be transmitted from the RNC to a user equipment (UE) utilizing at least a first base station and a second base station to provide a first serving cell and a second serving cell, respectively, to be aggregated at the UE 1802. The RNC may then receive a measuring report from the UE ranking the cell qualities of the first serving cell and the second serving cell 1804. The cell qualities of the first serving cell and the second serving cell may be ranked from the strongest serving cell to the weakest serving cell by the UE.

Next, the RNC may perform a serving cell change where the first base station or the second base station continues to act as a serving cell to the UE 1806. The acting serving cell may be selected based on the strongest cell quality from the ranked cell qualities and the acting serving cell may be the primary serving cell and the non-selected serving cell may be the secondary serving cell.

The measuring report may also include rankings of the cell qualities of one or more neighboring cells, provided by one or more base stations, upon an occurrence of a mobility event. A neighboring cell may be added to an active set associated with the UE when the cell quality of the neighboring cell is stronger than the cell quality of the primary serving cell or the secondary serving cell upon the occurrence of the mobility event.

Next, instructions may be sent by the RNC to the acting serving cell to maintain data corresponding to the flow before the serving cell change within a queue at the acting serving cell for transmission to the UE after the serving cell change 1808.

A serving cell change may occur as a result of a mobility event. As discussed above, a mobility event may include, but is not limited to, (1) the UE measurements of $E_c/I_0$ for a particular cell reaches a particular threshold and maintains that level for a certain time such that it may be appropriate to add the cell to the Active Set; (2) the UE measurements of $E_c/I_0$ for a particular cell falls below a particular or predetermined threshold, and maintains that level for a certain time such that it may be appropriate to remove the cell from the Active Set a reporting; and (3) a neighbor cell (which may or may not be within the Active Set) exceeds the quality of the serving HS-DSCH cell according to the UE measurements of $E_c/I_0$.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
   transmitting a downlink flow to a user equipment (UE) utilizing at least a first base station and a second base station to provide a first serving cell and a second serving cell, respectively, to be aggregated at the UE;
   performing a serving cell change by replacing the first serving cell or the second serving cell with a third cell when a quality of the third cell is greater than the first serving cell and the second serving cell, wherein the first base station or the second base station continues to act as a serving cell to the UE after the serving cell change; and
   forgoing to instruct the acting serving cell to flush data corresponding to the flow, so that the acting serving cell maintains the data corresponding to the flow before the serving cell change within a queue at the acting serving cell for transmission from the acting serving cell to the UE directly after the serving cell change.

2. The method of claim 1, further comprising:
   receiving a report from the UE ranking cell qualities of the first serving cell and the second serving cell, where the acting serving cell is selected based on strongest cell quality from the ranked cell qualities; and
   wherein the acting serving cell is a primary serving cell and the non-selected serving cell is the secondary serving cell.

3. The method of claim 2, wherein the report further includes ranking of the cell qualities of one or more neighboring cells including the third cell, provided by one or more base stations, upon an occurrence of a mobility event; and wherein the third cell is added to an active set associated with the UE when the cell quality of the third cell is stronger than the cell quality of the primary serving cell or the secondary serving cell upon the occurrence of the mobility event.

4. The method of claim 3, further comprising:
   performing a primary serving cell change by replacing the primary serving cell with the third cell when the cell quality of the third cell is greater than the cell quality of the primary serving cell, the third cell becoming a new primary serving cell;
   performing a secondary serving cell change by replacing the secondary serving cell with the primary serving cell when the cell quality of the primary serving cell is greater than the cell quality of the secondary serving cell, the primary serving cell becoming a new secondary serving cell;
   maintaining the data corresponding to the flow within a queue at the new primary serving cell; and
   flushing the data corresponding to the flow within a queue at the secondary serving cell.

5. The method of claim 3, further comprising:
   performing a primary serving cell change by replacing the primary serving cell with the secondary serving cell when the cell quality of the secondary serving cell is greater than the cell quality of the primary serving cell, the secondary serving cell becoming a new primary serving cell;
   performing a secondary serving cell change by replacing the secondary serving cell with the third cell when the cell quality of the third cell is greater than the cell quality of the secondary serving cell, the third cell becoming a new secondary serving cell;
   maintaining the data corresponding to the flow within a queue at the new primary serving cell; and
   flushing the data corresponding to the flow within a queue at the secondary serving cell.

6. The method of claim 3, further comprising:
   performing a primary serving cell change by replacing the primary serving cell with the third cell when the cell quality of the third cell is greater than the cell quality of the primary serving cell, the third cell becoming a new primary serving cell;
   maintaining the data corresponding to the flow within a queue at the new primary serving cell; and
   flushing the data corresponding to the flow within a queue at the primary serving cell.

7. The method of claim 3, further comprising:
   removing the secondary serving cell from the active set associated with the UE when the cell quality of the secondary serving cell is below a predetermined threshold; and
   flushing the data corresponding to the flow within a queue at the secondary serving cell.

8. The method of claim 3, further comprising:
   performing a primary serving cell change by replacing the primary serving cell with the secondary serving cell when the cell quality of the secondary serving cell is greater than the cell quality of the primary serving cell, the secondary serving cell becoming a new primary serving cell;
   removing the primary serving cell from the active set associated with the UE when the cell quality of the primary serving cell is below a predetermined threshold; and flushing the data corresponding to the flow within a queue at the primary serving cell.

9. The method of claim 3, wherein the mobility event is a UE measurement of $E_c/I_0$ for a particular cell that reaches a predetermined threshold and maintains the predetermined threshold for a predetermined time.

10. The method of claim 3, wherein the mobility event is a UE measurement of $E_c/I_0$ for a particular serving cell falls that below a predetermined threshold and maintains the predetermined threshold for a predetermined time.

11. An apparatus for wireless communication, comprising:
means for transmitting a downlink flow to user equipment (UE) utilizing at least a first base station and a second base station to provide a first serving cell and a second serving cell, respectively, to be aggregated at the UE;
means for performing a serving cell change by replacing the first serving cell or the second serving cell with a third cell when a quality of the third cell is greater than the first serving cell and the second serving cell, wherein the first base station or the second base station continues to act as a serving cell to the UE after the serving cell change; and
means for forgoing to instruct the acting serving cell to flush data corresponding to the flow, so that the acting serving cell maintains the data corresponding to the flow before the serving cell change within a queue at the acting serving cell for transmission from the acting serving cell to the UE directly after the serving cell change.

12. The apparatus of claim 11, further comprising:
means for receiving a report from the UE ranking cell qualities of the first serving cell and the second serving cell, where the acting serving cell is selected based on strongest cell quality from the ranked cell qualities; and
wherein the acting serving cell is a primary serving cell and the non-selected serving cell is the secondary serving cell.

13. The apparatus of claim 12, wherein the report further includes ranking of the cell qualities of one or more neighboring cells including the third cell, provided by one or more base stations, upon an occurrence of a mobility event; and wherein a the third cell is added to an active set associated with the UE when the cell quality of the third cell is stronger than the cell quality of the primary serving cell or the secondary serving cell upon the occurrence of the mobility event.

14. The apparatus of claim 13, further comprising:
means for performing a primary serving cell change by replacing the primary serving cell with the third cell when the cell quality of the third cell is greater than the cell quality of the primary serving cell, the third cell becoming a new primary serving cell;
means for performing a secondary serving cell change by replacing the secondary serving cell with the primary serving cell when the cell quality of the primary serving cell is greater than the cell quality of the secondary serving cell, the primary serving cell becoming a new secondary serving cell;
means for maintaining the data corresponding to the flow within a queue at the new primary serving cell; and
means for flushing the data corresponding to the flow within a queue at the secondary serving cell.

15. The apparatus of claim 13, further comprising:
means for performing a primary serving cell change by replacing the primary serving cell with the secondary serving cell when the cell quality of the secondary serving cell is greater than the cell quality of the primary serving cell, the secondary serving cell becoming a new primary serving cell;
means for performing a secondary serving cell change by replacing the secondary serving cell with the third cell when the cell quality of the third cell is greater than the cell quality of the secondary serving cell, the third cell becoming a new secondary serving cell;
means for maintaining the data corresponding to the flow within a queue at the new primary serving cell; and
means for flushing the data corresponding to the flow within a queue at the secondary serving cell.

16. The apparatus of claim 13, further comprising:
means for performing a primary serving cell change by replacing the primary serving cell with the third cell when the cell quality of the third cell is greater than the cell quality of the primary serving cell, the third cell becoming a new primary serving cell;
means for maintaining the data corresponding to the flow within a queue at the new primary serving cell; and
means for flushing the data corresponding to the flow within a queue at the primary serving cell.

17. The apparatus of claim 13, further comprising:
means for removing the secondary serving cell from the active set associated with the UE when the cell quality of the secondary serving cell is below a predetermined threshold; and
means for flushing the data corresponding to the flow within a queue at the secondary serving cell.

18. The apparatus of claim 13, further comprising:
means for performing a primary serving cell change by replacing the primary serving cell with the secondary serving cell when the cell quality of the secondary serving cell is greater than the cell quality of the primary serving cell, the secondary serving cell becoming a new primary serving cell;
means for removing the primary serving cell from the active set associated with the UE when the cell quality of the primary serving cell is below a predetermined threshold; and
means for flushing the data corresponding to the flow within a queue at the primary serving cell.

19. A computer program product, comprising:
a non-transitory computer-readable medium comprising:
instructions for causing a computer to transmit a downlink flow to user equipment (UE) utilizing at least a first base station and a second base station to provide a first serving cell and a second serving cell, respectively, to be aggregated at the UE;
instructions for causing a computer to perform a serving cell change by replacing the first serving cell or the second serving cell with a third cell when a quality of the third cell is greater than the first serving cell and the second serving cell, wherein the first base station or the second base station continues to act as a serving cell to the UE after the serving cell change; and
instructions for causing a computer to forgo to instruct the acting serving cell to flush data corresponding to the flow, so that the acting serving cell maintains the data corresponding to the flow before the serving cell change within a queue at the acting serving cell for transmission from the acting serving cell to the UE directly after the serving cell change.

20. The computer program product of claim 19, wherein the computer-readable medium further comprises:
instructions for causing a computer to receive a report from the UE ranking cell qualities of the first serving cell and the second serving cell, where the acting serving cell is selected based on strongest cell quality from the ranked cell qualities; and wherein the acting serving cell is a primary serving cell and the non-selected serving cell is the secondary serving cell.

21. The apparatus of claim 20, wherein the report further includes ranking of the cell qualities of one or more neighboring cells including the third cell, provided by one or more base stations, upon an occurrence of a mobility event; and wherein the third cell is added an active set associated with the UE when the cell quality of the third cell is stronger than the cell quality of the primary serving cell or the secondary serving cell upon the occurrence of the mobility event.

22. The computer program product of claim 21, wherein the computer-readable medium further comprises:
   instructions for causing a computer to perform a primary serving cell change by replacing the primary serving cell with the third cell when the cell quality of the third cell is greater than the cell quality of the primary serving cell, the third cell becoming a new primary serving cell;
   instructions for causing a computer to perform a secondary serving cell change by replacing the secondary serving cell with the primary serving cell when the cell quality of the primary serving cell is greater than the cell quality of the secondary serving cell, the primary serving cell becoming a new secondary serving cell;
   instructions for causing a computer to maintain the data, after cell change, corresponding to the flow within a queue at the new primary serving cell; and
   instructions for causing a computer to flush the data corresponding to the flow within a queue at the secondary serving cell.

23. The computer program product of claim 21, wherein the computer-readable medium further comprises:
   instructions for causing a computer to perform a primary serving cell change by replacing the primary serving cell with the secondary serving cell when the cell quality of the secondary serving cell is greater than the cell quality of the primary serving cell, the secondary serving cell becoming a new primary serving cell;
   instructions for causing a computer to perform a secondary serving cell change by replacing the secondary serving cell with the third cell when the cell quality of the third cell is greater than the cell quality of the secondary serving cell, the third cell becoming a new secondary serving cell;
   instructions for causing a computer to maintain the data corresponding to the flow within a queue at the new primary serving cell; and
   instructions for causing a computer to flush the data corresponding to the flow within a queue at the secondary serving cell.

24. The computer program product of claim 21, wherein the computer-readable medium further comprises:
   instructions for causing a computer to perform a primary serving cell change by replacing the primary serving cell with the third cell when the cell quality of the third cell is greater than the cell quality of the primary serving cell, the third cell becoming a new primary serving cell;
   instructions for causing a computer to maintain the data corresponding to the flow within a queue at the new primary serving cell; and
   instructions for causing a computer to flush the data corresponding to the flow within a queue at the primary serving cell.

25. The computer program product of claim 21, wherein the computer-readable medium further comprises:
   instructions for causing a computer to remove the secondary serving cell from the active set associated with the UE when the cell quality of the secondary serving cell is below a predetermined threshold; and
   instructions for causing a computer to flush the data corresponding to the flow within a queue at the secondary serving cell.

26. The computer program product of claim 21, wherein the computer-readable medium further comprises:
   instructions for causing a computer to perform a primary serving cell change by replacing the primary serving cell with the secondary serving cell when the cell quality of the secondary serving cell is greater than the cell quality of the primary serving cell, the secondary serving cell becoming a new primary serving cell;
   instructions for causing a computer to remove the primary serving cell from the active set associated with the UE when the cell quality of the primary serving cell is below a predetermined threshold; and
   instructions for causing a computer to flush the data corresponding to the flow within a queue at the primary serving cell.

27. An apparatus for wireless communication, comprising:
   at least one processor; and
   a memory coupled to the at least one processor,
   wherein the at least one processor is configured to:
      transmit a downlink flow to user equipment (UE) utilizing at least a first base station and a second base station to provide a first serving cell and a second serving cell, respectively, to be aggregated at the UE;
      perform a serving cell change by replacing the first serving cell or the second serving cell with a third cell when a quality of the third cell is greater than the first serving cell and the second serving cell, wherein the first base station or the second base station continues to act as a serving cell to the UE after the serving cell change; and
      forgo to instruct the acting serving cell to flush data corresponding to the flow, so that the acting serving cell maintains the data corresponding to the flow before the serving cell change within a queue at the acting serving cell for transmission from the acting serving cell to the UE directly after the serving cell change.

28. The apparatus of claim 27, wherein the at least one processor is further configured to:
   receive a report from the UE ranking cell qualities of the first serving cell and the second serving cell, where the acting serving cell is selected based on strongest cell quality from the ranked cell qualities; and
   wherein the acting serving cell is a primary serving cell and the non-selected serving cell is the secondary serving cell.

29. The apparatus of claim 28, wherein the report further includes ranking of the cell qualities of one or more neighboring cells including the third cell, provided by one or more base stations, upon an occurrence of a mobility event; and wherein the third cell is added an active set associated with the UE when the cell quality of the third cell is stronger than the cell quality of the primary serving cell or the secondary serving cell upon the occurrence of the mobility event.

30. The apparatus of claim 29, wherein the at least one processor is further configured to:
   perform a primary serving cell change by replacing the primary serving cell with the third cell when the cell quality of the third cell is greater than the cell quality of the primary serving cell, the third cell becoming a new primary serving cell;

perform a secondary serving cell change by replacing the secondary serving cell with the primary serving cell when the cell quality of the primary serving cell is greater than the cell quality of the secondary serving cell, the primary serving cell becoming a new secondary serving cell;

maintain the data corresponding to the flow within a queue at the new primary serving cell; and flush the data corresponding to the flow within a queue at the secondary serving cell.

31. The apparatus of claim 29, wherein the at least one processor is further configured to:

perform a primary serving cell change by replacing the primary serving cell with the secondary serving cell when the cell quality of the secondary serving cell is greater than the cell quality of the primary serving cell, the secondary serving cell becoming a new primary serving cell;

perform a secondary serving cell change by replacing the secondary serving cell with the third cell when the cell quality of the third cell is greater than the cell quality of the secondary serving cell, the third cell becoming a new secondary serving cell;

maintain the data corresponding to the flow within a queue at the new primary serving cell; and flush the data corresponding to the flow within a queue at the secondary serving cell.

32. The apparatus of claim 29, wherein the at least one processor is further configured to:

perform a primary serving cell change by replacing the primary serving cell with the third cell when the cell quality of the third cell is greater than the cell quality of the primary serving cell, the third cell becoming a new primary serving cell;

maintain the data corresponding to the flow within a queue at the new primary serving cell; and flush the data corresponding to the flow within a queue at the primary serving cell.

33. The apparatus of claim 29, wherein the at least one processor is further configured to:

remove the secondary serving cell from the active set associated with the UE when the cell quality of the secondary serving cell is below a predetermined threshold; and flush the data corresponding to the flow within a queue at the secondary serving cell.

34. The apparatus of claim 29, wherein the at least one processor is further configured to:

perform a primary serving cell change by replacing the primary serving cell with the secondary serving cell when the cell quality of the secondary serving cell is greater than the cell quality of the primary serving cell, the secondary serving cell becoming a new primary serving cell;

remove the primary serving cell from the active set associated with the UE when the cell quality of the primary serving cell is below a predetermined threshold; and flush the data corresponding to the flow within a queue at the primary serving cell.

* * * * *